US011068666B2

(12) United States Patent
Sengupta et al.

(10) Patent No.: US 11,068,666 B2
(45) Date of Patent: Jul. 20, 2021

(54) NATURAL LANGUAGE PROCESSING USING JOINT SENTIMENT-TOPIC MODELING

(71) Applicant: Optum Technology, Inc., Eden Prairie, MN (US)

(72) Inventors: Ayan Sengupta, Noida (IN); Suman Roy, Bangalore (IN); Siddhartha Asthana, Ghaziabad (IN); Gaurav Ranjan, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 0 days.

(21) Appl. No.: 16/599,588

(22) Filed: Oct. 11, 2019

(65) Prior Publication Data

US 2021/0109994 A1 Apr. 15, 2021

(51) Int. Cl.
  *G06F 40/30* (2020.01)
  *G06N 5/04* (2006.01)

(52) U.S. Cl.
  CPC .............. *G06F 40/30* (2020.01); *G06N 5/04* (2013.01)

(58) Field of Classification Search
  CPC ................................. G06F 40/30; G06N 5/04
  See application file for complete search history.

(56) References Cited

U.S. PATENT DOCUMENTS 7,788,264 B2  8/2010 Zhu et al.
8,356,086 B2  1/2013 Liu et al.
8,515,879 B2  8/2013 Huh et al.
(Continued)

FOREIGN PATENT DOCUMENTS

CN  104199829 A  12/2014
EP    3340069 A1   6/2018

OTHER PUBLICATIONS

"Deeply Moving: Deep Learning for Sentiment Analysis," (6 pages), [article], [online], [Retrieved from the Internet Dec. 18, 2019] <https://nlp.stanford.edu/sentiment/>.

(Continued)

*Primary Examiner* — Kevin Ky
(74) *Attorney, Agent, or Firm* — Alston & Bird LLP

(57) ABSTRACT

There is a need for more effective and efficient natural language processing (NLP) solutions. This need can be addressed by, for example, solutions for performing NLP analysis by utilizing joint topic-sentiment (JST) modeling. In one example, a method comprises receiving a per-document topic distribution for a digital document, wherein the per-document topic distribution comprises a per-document topic correlation indication for each candidate topic designation; receiving a per-document topic-sentiment distribution for the digital document, wherein the per-document topic-sentiment distribution comprises a per-document topic-sentiment correlation indication for each topic-sentiment pair of a candidate topic designation and a candidate sentiment designation; generating, based at least in part on the per-document topic distribution and the per-document topic-sentiment distribution, a topic designation and a sentiment designation for each selected word in the digital document; and generating a JST modeling output based a on each topic designation and each sentiment designation.

20 Claims, 15 Drawing Sheets

(56) References Cited

U.S. PATENT DOCUMENTS

| | | | | |
|---|---|---|---|---|
| 8,676,730 | B2* | 3/2014 | Ghani | G06N 20/10 |
| | | | | 706/12 |
| 8,682,649 | B2 | 3/2014 | Bellegarda | |
| 8,719,302 | B2 | 5/2014 | Bailey et al. | |
| 9,116,983 | B2* | 8/2015 | Ameri-Yahia | G06F 16/358 |
| 9,449,080 | B1 | 9/2016 | Zhang | |
| 9,501,525 | B2 | 11/2016 | Barker et al. | |
| 9,575,952 | B2 | 2/2017 | Sridhar | |
| 9,672,555 | B1 | 6/2017 | Dillard et al. | |
| 10,754,883 | B1* | 8/2020 | Kannu | G06F 16/335 |
| 2007/0064626 | A1 | 3/2007 | Evans | |
| 2008/0313144 | A1 | 12/2008 | Huston | |
| 2009/0319518 | A1 | 12/2009 | Koudas et al. | |
| 2010/0023311 | A1 | 1/2010 | Subrahmanian et al. | |
| 2010/0153318 | A1 | 6/2010 | Branavan et al. | |
| 2012/0239668 | A1 | 9/2012 | Bhattacharyya et al. | |
| 2013/0018651 | A1* | 1/2013 | Djordjevic | G06Q 10/00 |
| | | | | 704/9 |
| 2013/0054502 | A1* | 2/2013 | Fano | G06F 16/248 |
| | | | | 706/46 |
| 2014/0280361 | A1 | 9/2014 | Aliferis et al. | |
| 2015/0106080 | A1* | 4/2015 | Miura | G06F 40/30 |
| | | | | 704/9 |
| 2015/0254565 | A1 | 9/2015 | Beigman Klebanov et al. | |
| 2015/0286710 | A1 | 10/2015 | Chang et al. | |
| 2017/0046601 | A1 | 2/2017 | Chang et al. | |
| 2017/0068667 | A1 | 3/2017 | Sundaresan et al. | |
| 2017/0083817 | A1 | 3/2017 | Di Sciullo et al. | |
| 2017/0116204 | A1 | 4/2017 | Davaleu et al. | |
| 2017/0124174 | A1 | 5/2017 | Starr et al. | |
| 2017/0323065 | A1* | 11/2017 | Proctor Beauchamp | |
| | | | | G06N 20/00 |
| 2018/0357302 | A1 | 12/2018 | Qi et al. | |
| 2020/0019611 | A1* | 1/2020 | Tutubalina | G06F 17/18 |

OTHER PUBLICATIONS

"Sentiment Analysis," General Architecture for Text Engineering, (2 pages), [article], [online], [Retrieved from the Internet Dec. 18, 2019] <https://gate.ac.uk/applications/sentiment.html>.
"Sentiment Analysis," OpenText, (6 pages), [article], [online], [Retrieved from the Internet Dec. 18, 2019] <https://www.opentext.com/products-and-solutions/products/discovery/information-access-platform/sentiment-analysis>.
"Tone Analyzer," IBM Watson, (10 pages), [online], [Retrieved from the Internet Dec. 19, 2019] <https://www.ibm.com/watson/services/tone-analyzer/>.
W. Xu, X. Liu, and Y. Gong. Document Clustering Based on Non-Negative Matrix Factorization, In Proceedings of the 26th Annual International ACM SIGIR Conference on Research and Development in Information Retrieval, SIGIR '03, pp. 267-273, Jul. 28, 2003. ACM.
Alshari, Eissa et al. "Improvement of Sentiment Analysis Based on Clustering of Word2Vec Features," In 28th International Workshop on Database and Expert Systems Applications (DEXA), Aug. 29, 2017, pp. 123-126. IEEE.
Arbelaitz, Olatz et al. "An Extensive Comparative Study of Cluster Validity Indices," Pattern Recognition, vol. 46, No. 1, (2013), pp. 243-256.
Bagheri, Ayoub et al. "ADM-LDA: An Aspect Detection Model Based on Topic Modelling Using the Structure of Review Sentences," Journal of Information Science 2014, vol. 40, Issue 5, pp. 621-636.
Blei, David M. et al. "Latent Dirichlet Allocation," Journal of Machine Learning Research, vol. 3, (2003), pp. 993-1022.
Boyd-Graber, Jordan et al. "Holistic Sentiment Analysis Across Languages: Multilingual Supervised Latent Dirichlet Allocation," Proceedings of the 2010 Conference on Empirical Methods in Natural Language Processing, Oct. 9, 2010, pp. 45-55.
Ding, Chris et al. "Orthogonal Non-Negative Matrix Tri-Factorizations for Clustering," In Proceedings of the Twelfth ACM SIGKDD International Conference on Knowledge Discovery and Data Mining, Aug. 20, 2006, pp. 126-135.
Griffiths, Griffiths and M. Steyvers. Finding scientific topics. Proceedings of the National Academy of Sciences, Apr. 6, 2004, vol. 101, Suppl. 1, pp. 5228-5235.
HB, Barathi Ganesh et al. "Distributional Semantic Representation in Health Care Text Classification," 2016, (4 pages).
He, Zhaoshui et al. "Symmetric Nonnegative Matrix Factorization: Algorithms and Applications to Probabilistic Clustering." IEEE Transactions on Neural Networks, vol. 22, No. 12, Dec. 2011, pp. 2117-2131.
Hofmann, Thomas. "Probabilistic Latent Semantic Indexing," In SIGIR Forum, (1999), pp. 50-57, ACM.
Hu, Xia et al. "Unsupervised Sentiment Analysis With Emotional Signals," In Proceedings of the 22nd International Conference on World Wide Web May 13, 2013, pp. 607-618. ACM.
Keiningham, Timothy L. et al. "A Longitudinal Examination of Net Promoter and Firm Revenue Growth," Journal of Marketing, vol. 71, No. 3, Jul. 2007, pp. 39-51.
Kim, Soo-Min et al. "Determining the Sentiment of Opinions," In Proceedings of the 20th International Conference on Computational Linguistics Aug. 23, 2004, (7 pages), Association for Computational Linguistics.
Kuang, Da et al. "Nonnegative Matrix Factorization for Interactive Topic Modeling and Document Clustering," Springer International publishing Switzerland 2015, pp. 215-243. DOI: 10.1007/978-3-319-09259-1_7.
Lee, Daniel D. et al. "Algorithms for Non-Negative Matrix Factorization," In Advances in Neural Information Processing Systems 13, pp. 556-562, MIT Press, 2001. T.K. Leen, T.G. Dietterick, and V. Tresp, Editors.
Li, Tao et al. "A Non-Negative Matrix Tri-Factorization Approach to Sentiment Classification With Lexical Prior Knowledge." In Proceedings of the 47th Annual Meeting of the ACL and the 4th International Joint Conference on Natural Language Processing of the AFNLP, pp. 244-252, Aug. 2, 2009, Suntec, Singapore.
Li, Tao et al. "Knowledge Transformation From Word Space to Document Space," In Proceedings of the 31st Annual International ACM SIGIR'08, pp. 187-194, Jul. 20, 2008, Singapore.
Lin, Chenghua et al. "Joint Sentiment Topic Model for Sentiment Analysis," In Proceedings of the 18th ACM Conference on Information and Knowledge Management, CIKM '09, pp. 375-384, Nov. 2, 2009. ACM.
Liu, Bing et al. "Opinion Observer: Analyzing and Comparing Opinions on the Web," In Proceedings of the 14th International Conference on World Wide Web, WWW'05, pp. 342-351, May 10, 2005, Chiba, Japan.
Mei, Qiaozhu et al. "Automatic Labeling of Multinomial Topic Models," In Proceedings of the 13th ACM SIGKDD International Conference on Knowledge Discovery and Data Mining, pp. 490-499, Aug. 12, 2007, San Jose, California.
Mei, Qiaozhu et al. "Topic Sentiment Mixture: Modeling Facets and Opinions in Weblogs," In Proceedings of the 16th International Conference on World Wide Web, WWW'07, pp. 171-180, May 8, 2007, Banff, Alberta, Canada.
Mikolov, Tomas et al. "Efficient Estimation of Word Representations in Vector Space," pp. 1-12, arXiv:1301.3781v3 [cs.CL], Sep. 7, 2013.
O'Hare, Neil et al. "Topic-Dependent Sentiment Analysis of Financial Blogs," In Proceedings of the 1st International CIKM Workshop on Topic-Sentiment Analysis for Mass Opinion Measurement, Nov. 6, 2009, pp. 9-16, Hong Kong, China. ACM.
Pang, Bo et al. "Opinion Mining and Sentiment Analysis," Foundations and Trends in Information Retrieval, vol. 2, No. 1-2, pp. 1-135, (2008).
Pang, Bo et al. "Thumbs Up? Sentiment Classification Using Machine Learning Techniques," In Proceedings of the 2002 Conference on Empirical Methods in Natural Language Processing (EMNLP), arXiv:cs/0205070v1 [cs.CL], May 28, 2002.
Poddar, Lahari et al. "Author-Aware Aspect Topic Sentiment Model to Retrieve Supporting Opinions From Reviews," In Proceedings of

(56) References Cited

OTHER PUBLICATIONS the 2017 Conference on Empirical Methods in Natural Language Processing, EMNLP'17, pp. 472-481, Sep. 7, 2017, Copenhagen, Denmark.
Rahman, Md Mustafizur et al. "Hidden Topic Sentiment Model," In Proceedings of the 25th International Conference on World Wide Web, WWW '16, pp. 155-165, Apr. 11, 2016, Montreal, Quebec, Canada.
Titov, Ivan et al. "A Joint Model of Text and Aspect Ratings for Sentiment Summarization," In Proceedings of ACL-08: HLT, pp. 308-316, Jun. 2008, Association for Computational Linguistics.
Turney, Peter D. "Thumbs Up or Thumbs Down? Semantic Orientation Applied to Unsupervised Classification of Reviews," In Proceedings of the 40th Annual Meeting of the Association for Computational Linguistics (ACL)'04, pp. 417-424, Jul. 6, 2002.
Waggoner, Alexander A. "Triple Non-Negative Matrix Factorization Technique for Sentiment Analysis and Topic Modeling," (2017), CMC Senior Theses.1550, Claremont McKenna College, (25 pp.). [Retrieved from the Internet Dec. 18, 2019] <https://scholarship.claremont.edu/cmc_theses/1550/>.
Yan, Xiaohui et al. "Learning Topics in Short Texts by Non-Negative Matrix Factorization on Term Correlation Matrix," In Proceedings of the 13th SIAM International Conference on Data Mining, May 2, 2013, pp. 749-757, Society for Industrial and Applied Mathematics.
Zhao, Jun et al. "Adding Redundant Features for CRFs-Based Sentence Sentiment Classification," In Proceedings of the 2008 Conference on Empirical Methods in Natural Language Processing, EMNLP '08, pp. 117-126, Oct. 2008, Association for Computational Linguistics, Honolulu, Hawaii.
"LDA and Document Similarity," Kaggle, (12 pages). [Online]. [Retrieved from the Internet Dec. 1, 2020] <URL: https://www.kaggle.com/ktattan/lda-and-document-similarity>.
Mehra, Nipun et al. "Sentiment Identification Using Maximum Entropy Analysis of Movie Reviews," Stanford University, (2002), (7 pages).
University of Massachusetts, "Topic Model Diagnostics," MAchine Learning for LanguagE Toolkit (MALLET), (7 pages). [Article, Online]. [Retrieved from the Internet Dec. 1, 2020] <URL: http://mallet.cs.umass.edu/diagnostics.php>.
Yang, Alex et al. "Inferring Business Similarity From Topic Modeling [Latent Dirichlet Allocation and Jaccard Similarity Applied to Yelp Reviews]," (2015), (7 pages). [Retrieved from the Internet Dec. 1, 2020] <URL: http://cseweb.ucsd.edu/classes/sp15/cse190-c/reports/sp15/004.pdf>.
Putri, Indiati Restu et al. "Latent Dirichlet Allocation (LDA) for Sentiment Analysis Toward Tourism Review in Indonesia," International Conference on Computing and Applied Informatics 2016, IOP Conference Series: Journal of Physics: Conference Series, No. vol. 801, No. 1:0102073, Jan. 2017, pp. 1-6. DOI: 10.1088/1742-6596/801/1/012073.
Raja Mohana S.P. et al. "Sentiment Classification Based on Latent Dirichlet Allocation," International Journal of Computer Applications (0975-8887), International Conference on Innovations in Computing Techniques (ICICT 2015), Jan. 2015, pp. 14-16.

* cited by examiner

121

Per-Document Topic Distribution (θ)
401

Per-Document Topic-Sentiment Distribution (π)
402

Cross-Document Per-Word Topic-Sentiment Distribution (φ)
403

FIG. 4

| Document | Topic 1 | Topic 2 | Topic 3 |
|---|---|---|---|
| 1 | 0.75 | 0.25 | 0.25 | — 811
| 2 | 0.3 | 0.6 | 0.1 | — 812
| 3 | 0.1 | 0.4 | 0.5 | — 813

FIG. 8

| Topic | Sentiment ☺ | Sentiment ☹ |
|---|---|---|
| 1 | 0.9 | 0.1 |
| 2 | 0.6 | 0.4 |
| 3 | 0.2 | 0.8 |

(Document 1, Document 2, Document 3)

"Obama was all over the news because of the inspiring speech he gave yesterday"

FIG. 13

NATURAL LANGUAGE PROCESSING USING JOINT SENTIMENT-TOPIC MODELING

BACKGROUND

Various embodiments of the present invention address technical challenges related to performing natural language processing (NLP). Existing NLP systems are ill-suited to efficiently and reliably perform joint sentiment-topic (JST) modeling. Various embodiments of the present address the shortcomings of the noted NLP systems and disclose various techniques for efficiently and reliably performing JST modeling in NLP systems.

BRIEF SUMMARY

In general, embodiments of the present invention provide methods, apparatus, systems, computing devices, computing entities, and/or the like for performing JST modeling. Certain embodiments utilize systems, methods, and computer program products that perform JST modeling using one or more of per-document topic distributions, per-document topic-sentiment distributions, and cross-document per-word topic-sentiment distributions.

In accordance with one aspect, a method is provided. In one embodiment, the method comprises: receiving a per-document topic distribution for the digital document, wherein the per-document topic distribution comprises a per-document topic correlation indication for each candidate topic designation of a plurality of candidate topic designations; receiving a per-document topic-sentiment distribution for the digital document, wherein the per-document topic-sentiment distribution comprises a per-document topic-sentiment correlation indication for each topic-sentiment pair of a candidate topic designation of the plurality of candidate topic designations and a candidate sentiment designation of a plurality of candidate sentiment designations; generating, based at least in part on the per-document topic distribution and the per-document topic-sentiment distribution, a topic designation for each selected word of one or more selected words in the digital document and a sentiment designation for each selected word of the one or more selected words in the digital document; and generating the JST modeling output for the digital document based at least in part on each topic designation for a selected word of the one or more selected words and each sentiment designation for a selected word of the word or more selected words.

In accordance with another aspect, a computer program product is provided. The computer program product may comprise at least one computer-readable storage medium having computer-readable program code portions stored therein, the computer-readable program code portions comprising executable portions configured to: receive a per-document topic distribution for the digital document, wherein the per-document topic distribution comprises a per-document topic correlation indication for each candidate topic designation of a plurality of candidate topic designations; receive a per-document topic-sentiment distribution for the digital document, wherein the per-document topic-sentiment distribution comprises a per-document topic-sentiment correlation indication for each topic-sentiment pair of a candidate topic designation of the plurality of candidate topic designations and a candidate sentiment designation of a plurality of candidate sentiment designations; generate, based at least in part on the per-document topic distribution and the per-document topic-sentiment distribution, a topic designation for each selected word of one or more selected words in the digital document and a sentiment designation for each selected word of the one or more selected words in the digital document; and generate the JST modeling output for the digital document based at least in part on each topic designation for a selected word of the one or more selected words and each sentiment designation for a selected word of the word or more selected words.

In accordance with yet another aspect, an apparatus comprising at least one processor and at least one memory including computer program code is provided. In one embodiment, the at least one memory and the computer program code may be configured to, with the processor, cause the apparatus to: receive a per-document topic distribution for the digital document, wherein the per-document topic distribution comprises a per-document topic correlation indication for each candidate topic designation of a plurality of candidate topic designations; receive a per-document topic-sentiment distribution for the digital document, wherein the per-document topic-sentiment distribution comprises a per-document topic-sentiment correlation indication for each topic-sentiment pair of a candidate topic designation of the plurality of candidate topic designations and a candidate sentiment designation of a plurality of candidate sentiment designations; generate, based at least in part on the per-document topic distribution and the per-document topic-sentiment distribution, a topic designation for each selected word of one or more selected words in the digital document and a sentiment designation for each selected word of the one or more selected words in the digital document; and generate the JST modeling output for the digital document based at least in part on each topic designation for a selected word of the one or more selected words and each sentiment designation for a selected word of the word or more selected words.

BRIEF DESCRIPTION OF THE DRAWINGS

Figure 1:
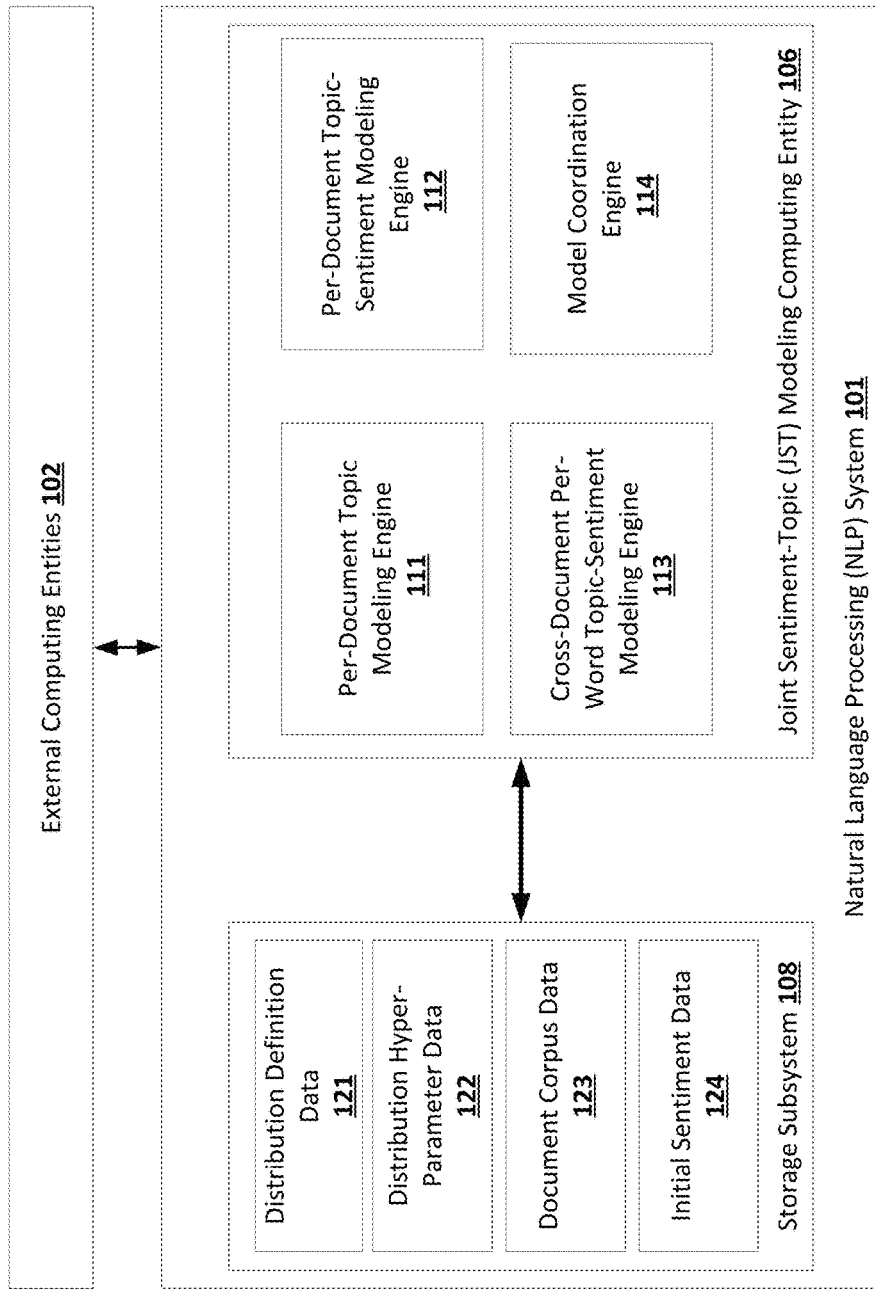

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
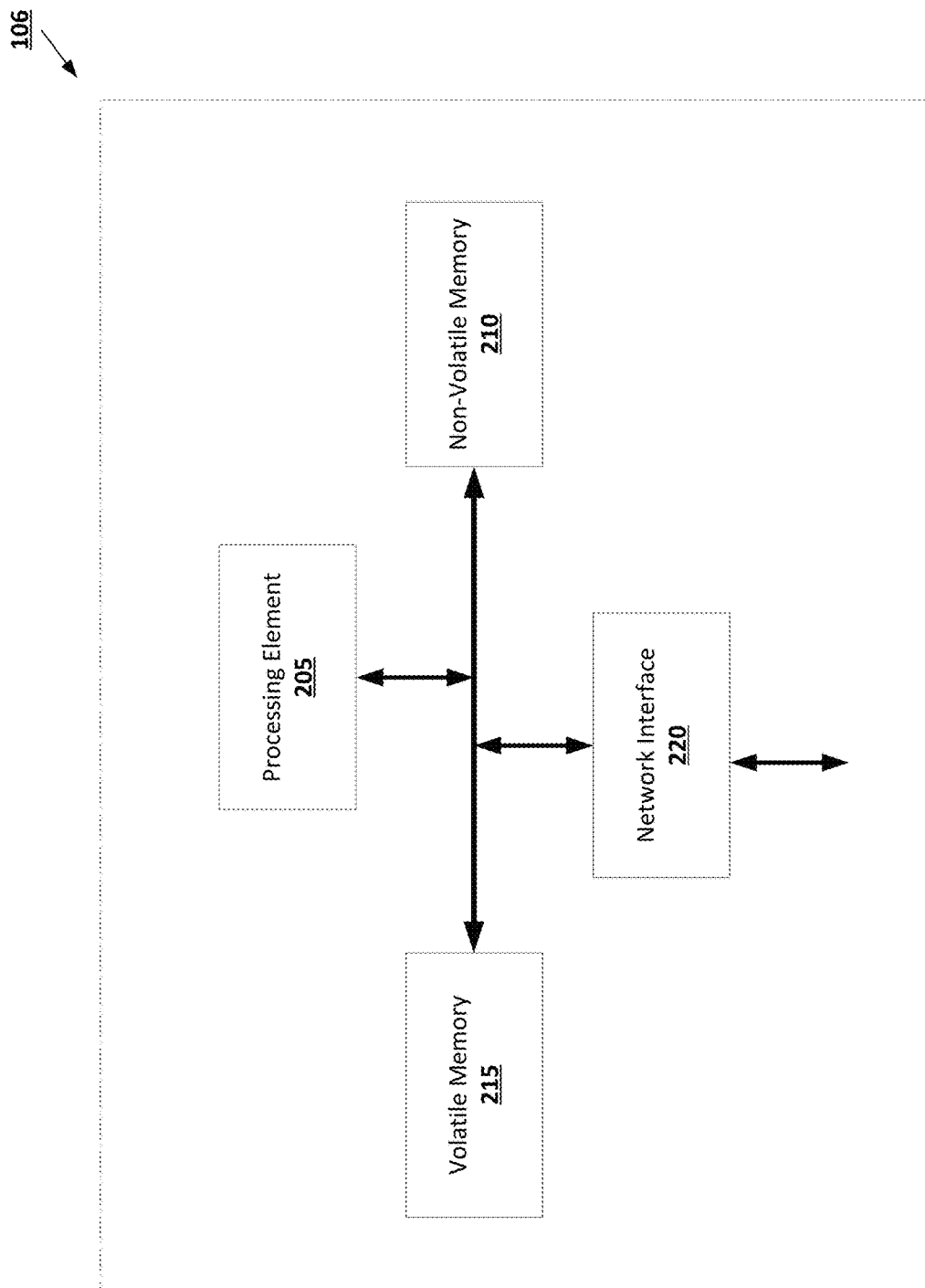

FIG. 2 provides an example JST modeling computing entity in accordance with some embodiments discussed herein.

Figure 3:
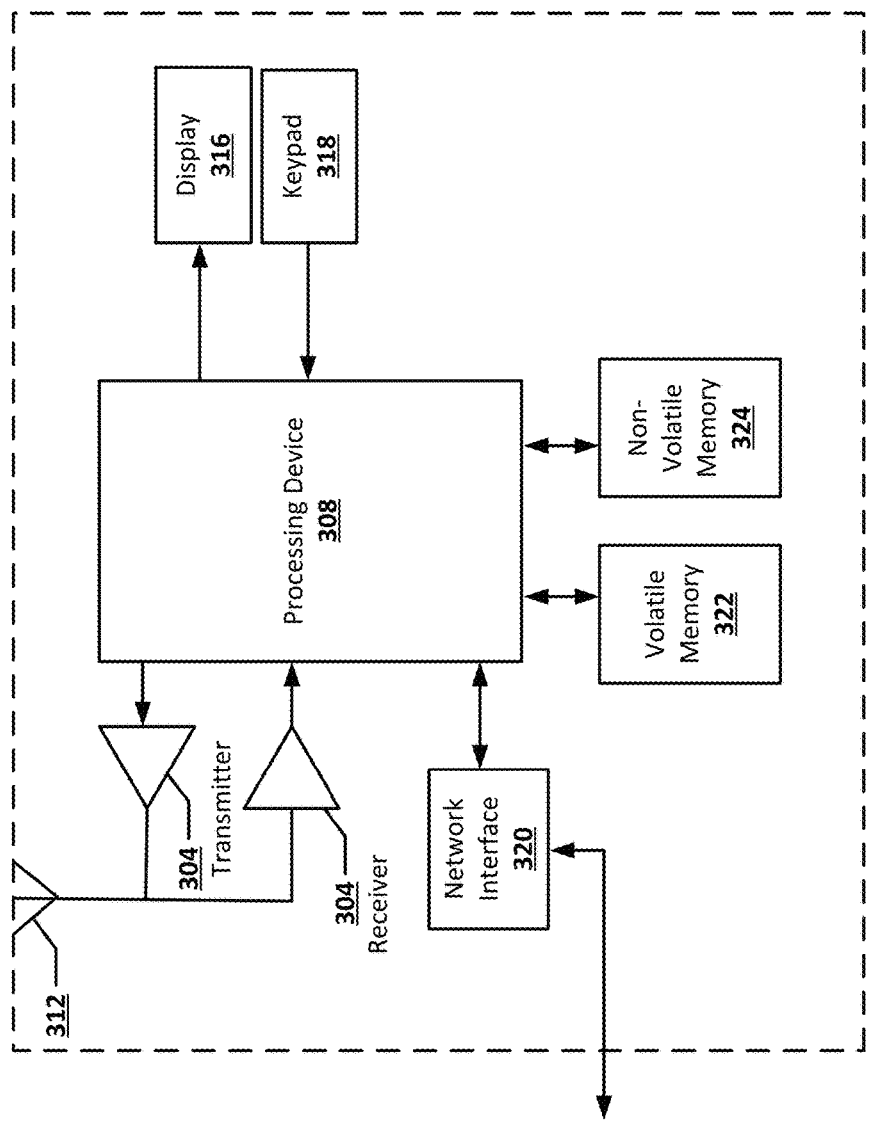

FIG. 3 provides an example external computing entity in accordance with some embodiments discussed herein.

FIG. 4 is a schematic diagram of example distribution definition data in accordance with some embodiments discussed herein.

Figure 5:

FIG. 5 is a schematic diagram of example distribution hyper-parameter data in accordance with some embodiments discussed herein.

Figure 6:
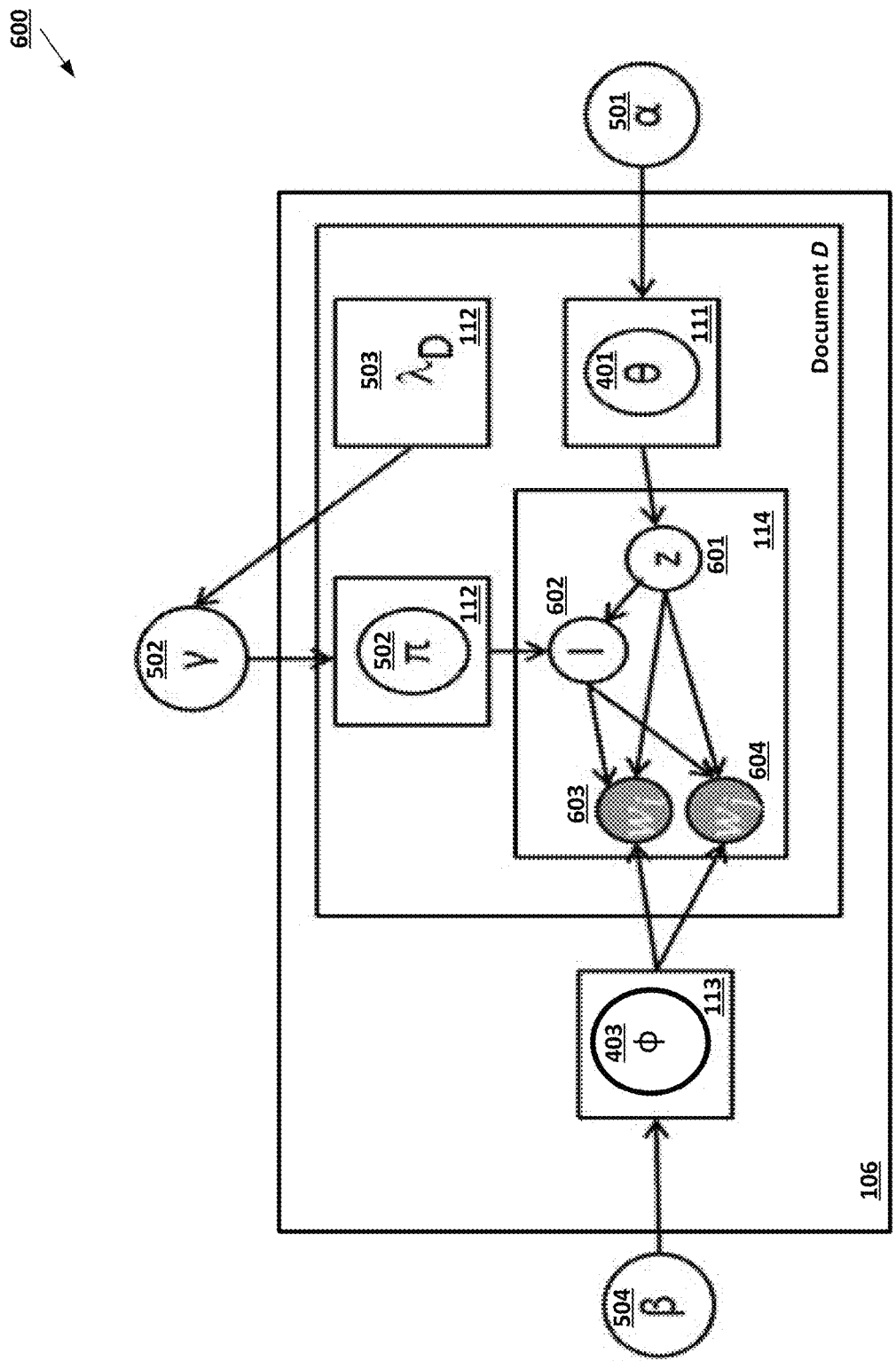

FIG. 6 is a data flow diagram of an example process for performing JST modeling operations with respect to an input document in accordance with some embodiments discussed herein.

Figure 7:
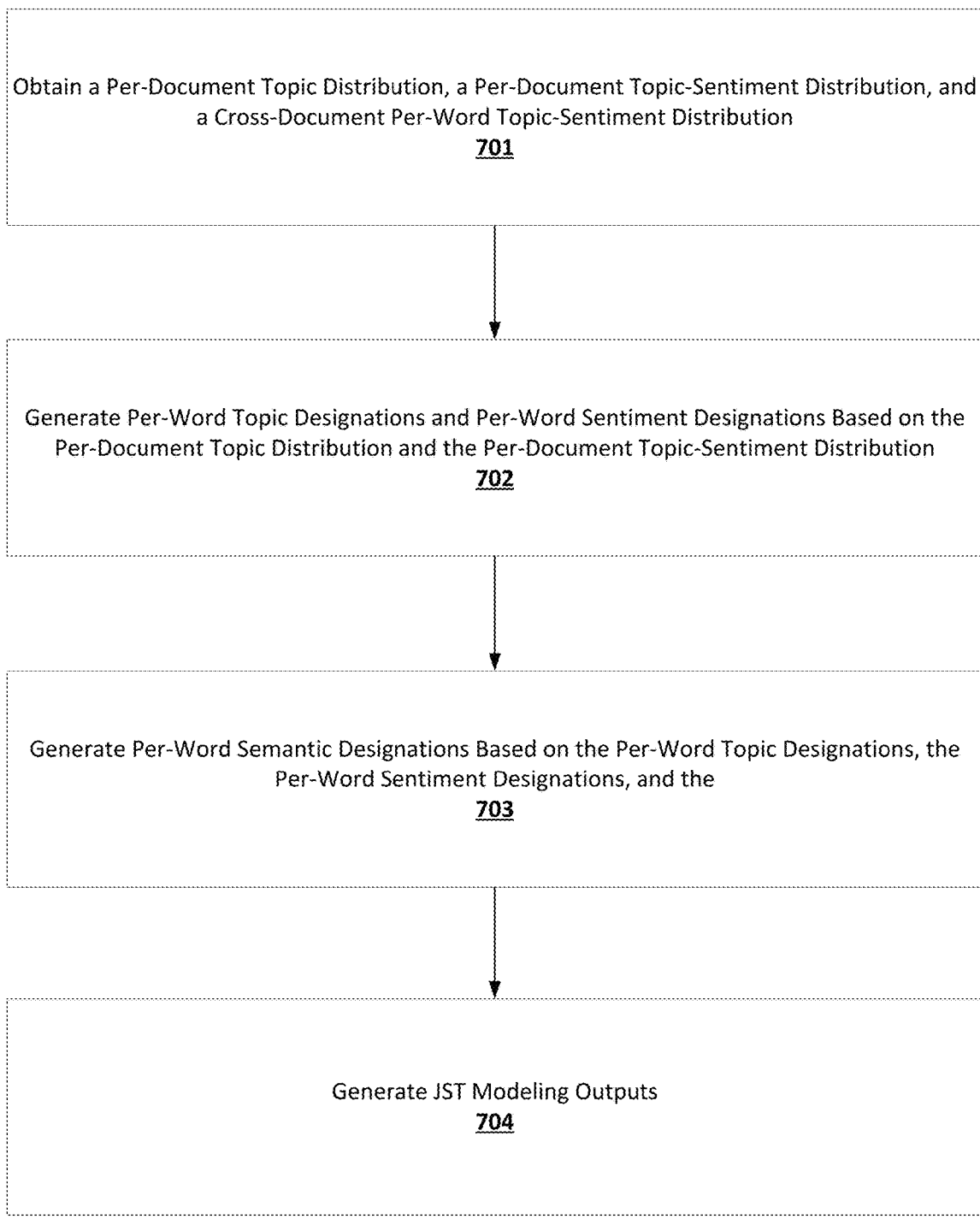

FIG. 7 is a flowchart diagram of an example process for utilizing per-document NLP distributions and cross-document NLP distributions in order to perform JST modeling operations with respect to an input document in accordance with some embodiments discussed herein.

FIG. 8 provides an operational example of a per-document topic distribution data object in accordance with some embodiments discussed herein.

FIG. 9 provides an operational example of a per-document topic-sentiment distribution data object in accordance with some embodiments discussed herein.

Figure 10:
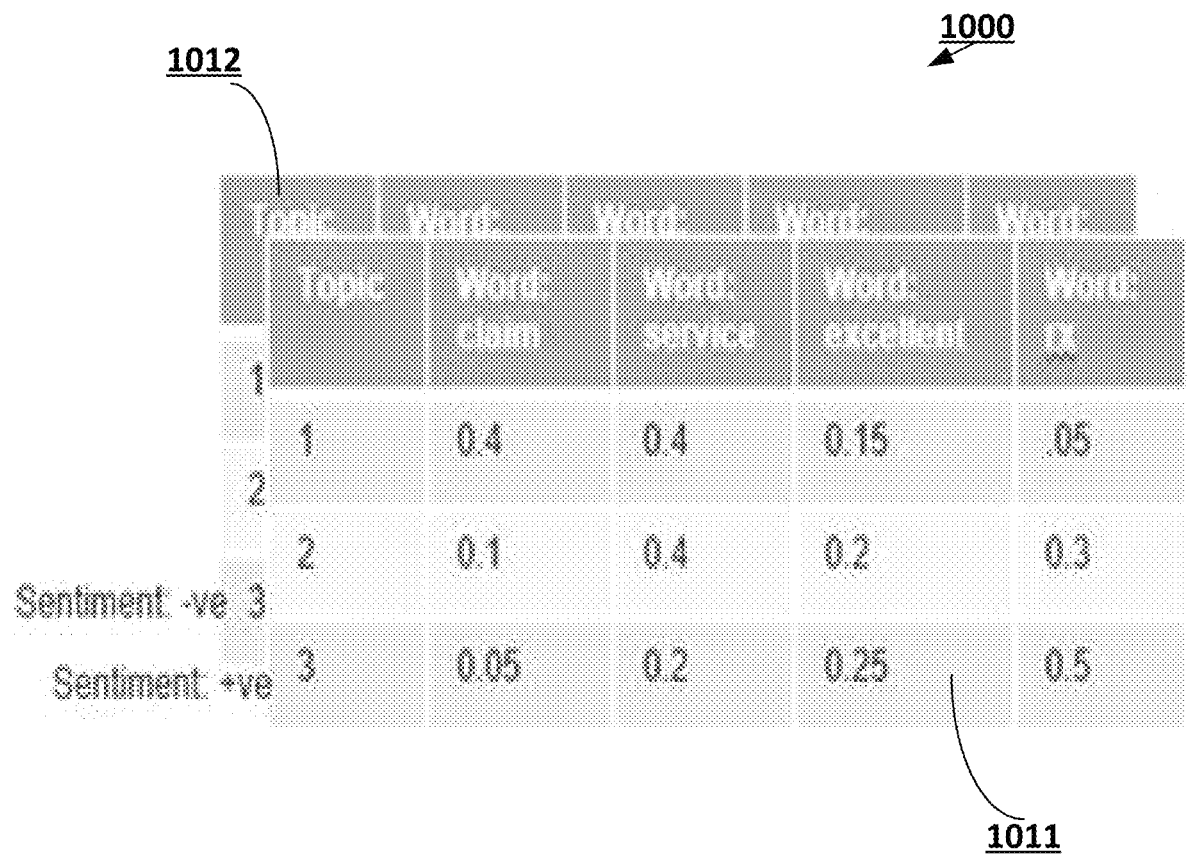

FIG. 10 provides an operational example of cross-document per-word topic-sentiment distribution data in accordance with some embodiments discussed herein.

Figure 11A:
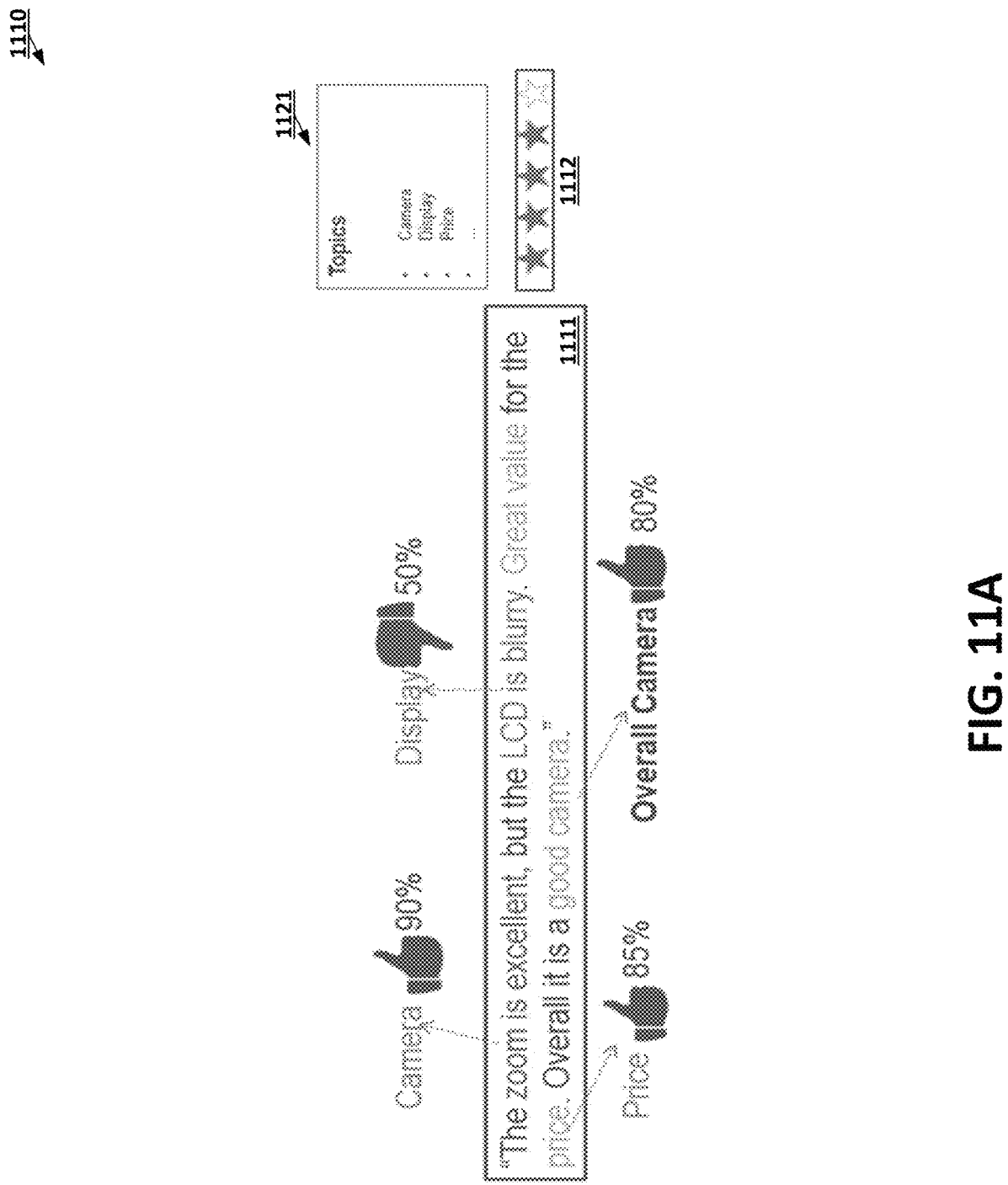
Figure 11B:
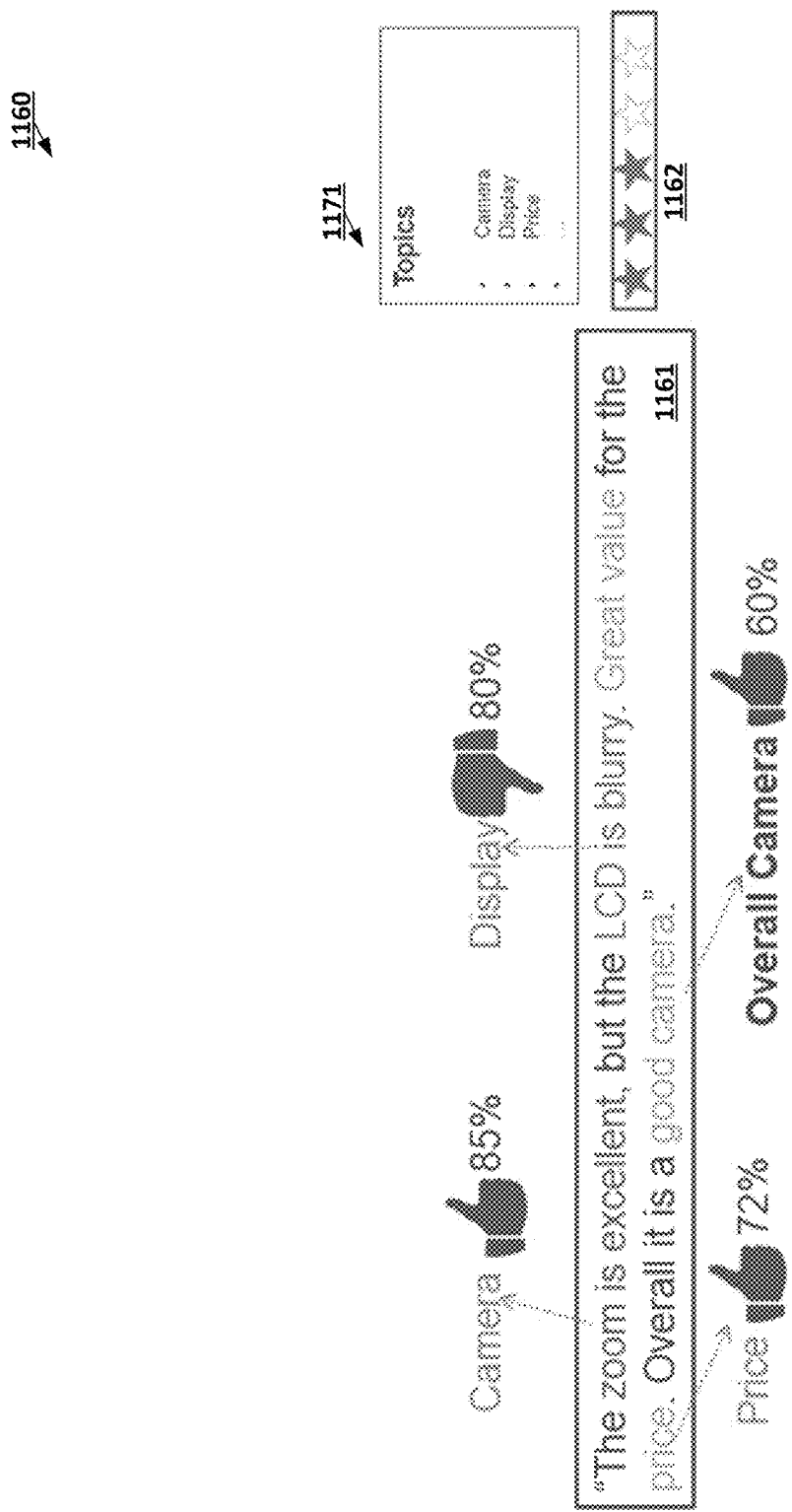

FIGS. 11A-B provide operational examples of JST modeling output interfaces in accordance with some embodiments discussed herein.

Figure 12:
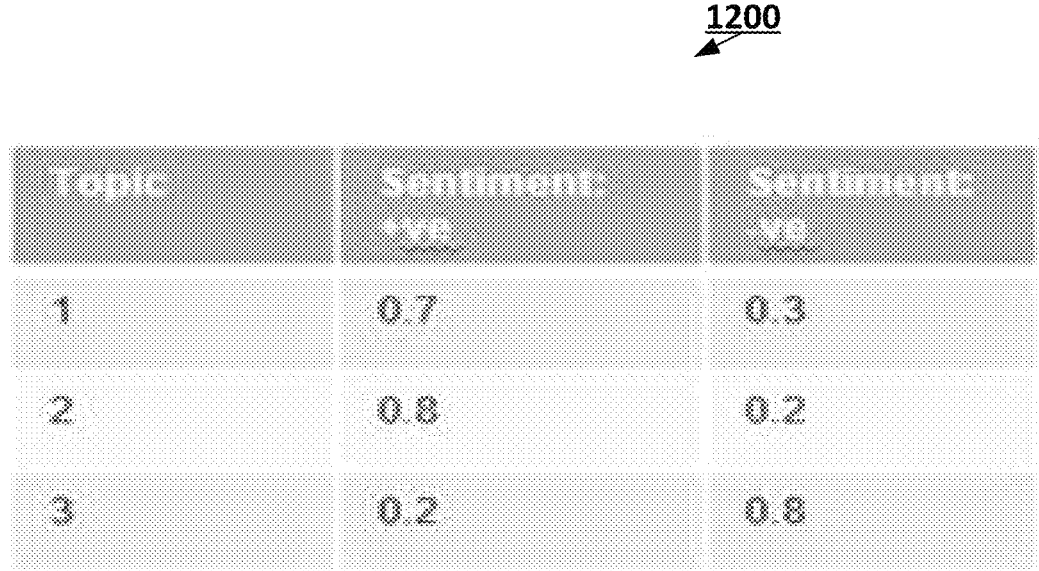

FIG. 12 provides an operational example of a cross-document per-word topic-sentiment distribution data object in accordance with some embodiments discussed herein.

FIG. 13 provides an operational example of a digital document in accordance with some embodiments discussed herein.

Figure 14:
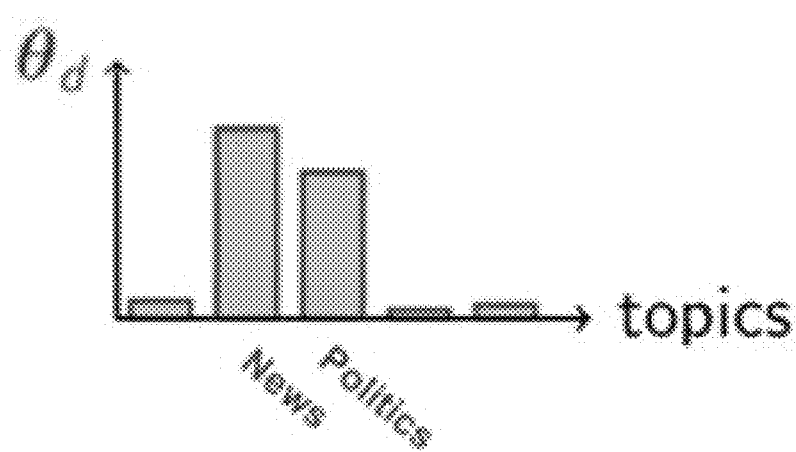

FIG. 14 provides an operational example of a topic-sentiment correlation graph in accordance with some embodiments discussed herein.

Figure 15:
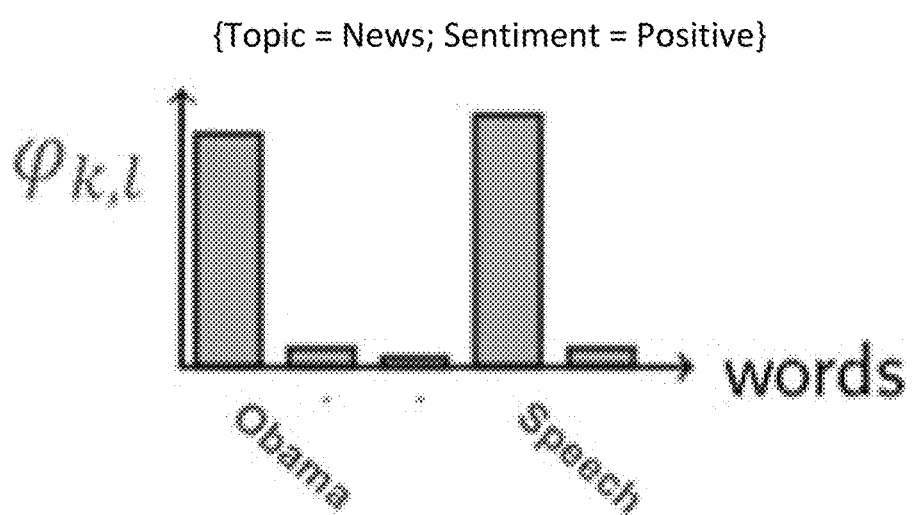

FIG. 15 provides an operational example of a topic word-sentiment correlation graph in accordance with some embodiments discussed herein.

Figure 16:
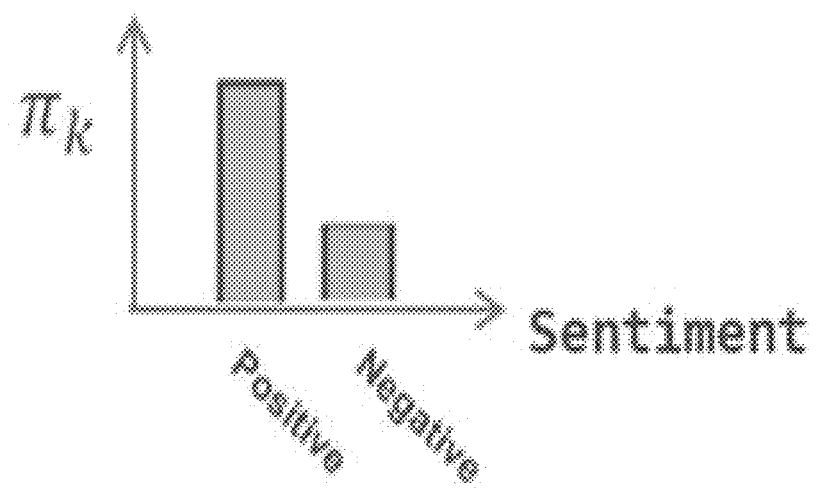

FIG. 16 provides an operational example of a topic-sentiment correlation graph in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Discussed herein methods, apparatus, systems, computing devices, computing entities, and/or the like for NLP analysis using JST modeling. As will be recognized, however, the disclosed concepts can be used to perform any type of NLP analysis, including topic detection, sentiment detection, machine translation, lexical analysis, semantic analysis, grammar analysis, tone analysis, and/or the like.

Technical Problems

JST modeling is an important problem in NLP analysis as it combines benefits of topic modeling and sentiment modeling. For example, one area in which JST modeling is beneficial relates to automatic feedback data analysis. When analyzing feedback data (e.g., customer feedback data), an NLP analysis module will benefit from determining not just which topics feedback data refers to and what sentiments the feedback data entails, but also how the topic model of the feedback data and the sentiment model of the feedback data relate to each other. For example, when analyzing a feedback data document indicating that "The price of the camera is high but the quality is good; overall I am satisfied," a NLP analysis module would benefit from inferring not just that the feedback document relates to cameras, price of cameras, and quality of cameras and that the feedback document has a particular overall sentiment, but also that the feedback data document has a positive sentiment with respect to the camera topic designation, a negative sentiment with respect to the camera price topic designation, and a positive sentiment with respect to the camera price topic designation.

As illustrated by the above-noted example, when an NLP analysis module is capable of performing effective JST modeling, it is better configured to understand complexities of NLP input documents and utilize such inferred complexities in facilitating various NLP-related applications. For example, a JST-enabled NLP analysis module is capable of performing effective predictive inferences based at least in part on NLP feedback data. Moreover, a JST-enabled NLP analysis module is capable of performing various operational adjustments and/or generating various operational recommendations for organizational predictive entities in accordance with predictive inferences that are performed based at least in part on the underlying NLP feedback data. For instance, a JST-enabled NLP analysis module may be able to process patient feedback data to perform operational adjustments and/or generate operational recommendations for one or more healthcare delivery organizational predictive entities, health insurance provider organizational predictive entities, human resource organizational predictive entities, and/or the like.

Despite the importance of the JST modeling problem to effective and reliable NLP analysis, various existing NLP analysis solutions fail to enable such JST modeling at all. Moreover, even when NLP analysis solutions facilitate some form of JST modeling, such JST modeling solutions suffer from many drawbacks. For example, many existing JST modeling solutions fail to enable topic detection, sentiment detection, and/or JST detection with respect to both individual documents in a document corpus and the document corpus as a whole. In other words, many existing JST modeling solutions fail to enable both local and global topic detection, sentiment detection, and/or JST detection with respect to a multi-document document corpus. This failure is significant as it undermines the ability of existing JST modeling solutions to utilize both document-specific predictive signals and cross-document predictive signals in performing topic detection, sentiment detection, and/or JST detection with respect to a multi-document document corpus. Thus, the failure of many existing JST modeling solutions in enabling both local and global predictive inference undermines the effectiveness of such JST modeling solutions.

As another example of the failures of various existing JST modeling solutions, many existing JST modeling solutions fail to enable sentiment analysis configured to generate each of binary sentiment designations, multi-class sentiment designations, and real-value sentiment designations. A binary sentiment designation for an NLP data item may categorize a sentimental aspect of the NLP data item as one of two candidate sentiment designations (e.g., a positive candidate sentiment designation and a negative candidate sentiment designation). A multi-class sentiment designation for an NLP data item may categorize a sentimental aspect of the NLP item as one of three or more candidate sentiment designations (e.g., a positive candidate sentiment designation, a negative candidate sentiment designation, and a neutral candidate sentiment designation). A real value sentiment designation for an NLP data item may categorize a sentimental aspect of the NLP item as one of an infinite number of continuous real-valued sentiment designation. Many existing JST modeling solutions use predictive models that fail to enable generation of all the noted three types of sentiment designations. For example, many feedforward-neural-network-based JST modeling solutions fail to enable generation of binary sentiment designations, multi-class sentiment designations, and real-value sentiment designations. Instead, many feedforward-neural-network-based JST modeling solutions are limited to the sentiment designation type defined for them during training.

As a further example, many existing JST modeling solutions are not configured to generate JST detections for documents that lack any prior sentiment labeling information and/or require extensive external lexicon information to perform effective and reliable JST modeling. Either of the two noted shortcomings limit the effectiveness of existing JST modeling solutions for performing JST modeling in NLP domains for which extensive prior sentiment label data and/or extensive lexicon definition information is not available. Thus, because of their failure to generate JST detections for documents that lack any prior sentiment labeling information and/or require extensive external lexicon information, many existing JST modeling solutions face substantial technical challenges, especially as it relates to performing JST modeling in NLP domains for which extensive prior sentiment label data and/or extensive lexicon definition information is not available.

Technical Solutions

Various embodiments of the present invention address shortcomings of NLP solutions that fail to enable effective and reliable JST modeling. For example, as further described below, various embodiments of the present invention disclose NLP solutions that perform JST modeling using one or more of per-document topic distributions, per-document topic-sentiment distributions, and cross-document per-word topic-sentiment distributions. By providing effective and reliable solutions for JST modeling, various embodiments of the present invention address technical shortcomings of NLP systems that fail to properly model interactions between inferred topic models of documents and inferred sentiment models of documents. By modeling interactions between inferred topic models of documents and inferred sentiment models of documents, various embodiments of the present invention make technical contributions to effectiveness and reliability of NLP in domains in which interactions between inferred topic models of documents and inferred sentiment models of documents provide important predictive signals for NLP. As discussed above, examples of such domains include NLP domains that relate to feedback processing for improving operational processes. Accordingly, various embodiments of the present invention make important technical contributions to improving feedback processing and to improving operational processes in various organizational predictive entities such as hospitals.

Various embodiments of the present invention address technical challenges of JST solutions that fail to generate per-document and cross-document JST detections. For example, to perform per-document JST modeling, various embodiments of the present invention disclose inferring per-document topic distributions for particular documents and per-document topic-sentiment distributions for particular documents. Moreover, to perform cross-document JST modeling, various embodiments of the present invention disclose inferring cross-document per-word topic-sentiment distributions for particular vocabulary collections and sampling from such cross-document per-word topic-sentiment distributions to generate cross-document word associations. By disclosing performing all of per-document topic distributions, per-document topic-sentiment distributions, and cross-document per-word topic-sentiment distributions, various embodiments of the present invention disclose generating local JST detections (e.g., per-document JST detections) and global JST detections (e.g., cross-document JST detections, such as per-document-corpus JST detections). In doing so, various embodiments of the present invention address technical shortcomings of JST solutions that fail to generate per-document and cross-document JST detections.

Various embodiments of the present invention address technical shortcomings of JST modeling solutions that fail to generate all of binary sentiment designations, multi-class designations, and real-value sentiment designations. For example, various embodiments of the present invention generate sentiment-related designations by utilizing probabilistic models that do not discriminate between various sentiment designation types when performing sentiment-related inferences. By utilizing probabilistic models that do not discriminate between various sentiment designation types when performing sentiment-related inferences, various embodiments of the present invention enable generating all of binary sentiment designations, multi-class designations, and real-value sentiment designations. In doing so, various embodiments of the present invention address technical shortcomings of JST modeling solutions that fail to generate all of binary sentiment designations, multi-class designations, and real-value sentiment designations.

Various embodiments of the present invention enable JST modeling for both sentiment-labeled documents and non-sentiment-labeled documents as well as without any domain lexicon information. For example, various embodiments of the present invention utilize any prior sentiment information to optionally adjust a cross-document sentiment distribution hyper-parameter that can in turn be used to define a per-document topic-sentiment distribution. By utilizing prior sentiment information as an optional adjustment parameter rather than a required parameter, various embodiments of the present invention enable JST modeling for both sentiment-labeled documents and non-sentiment-labeled documents. Moreover, various embodiments of the present invention enable performing JST modeling without any lexicon information, e.g., without utilizing any information about semantic meanings of particular linguistic constructs. Accordingly, various embodiments of the present invention enable JST modeling for both sentiment-labeled documents and non-sentiment-labeled documents as well as without any domain lexicon information. In doing so, various embodiments of the present invention address technical shortcomings of existing JST modeling solutions that fail to enable one or both of JST modeling for both sentiment-labeled documents and non-sentiment-labeled documents and JST modeling without any domain lexicon information.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example architecture 100 for performing JST modeling operations. The architecture 100 includes an NLP system 101 as well as one or more external computing entities 102. The external computing entities 102 may be configured to provide NLP inputs to the NLP system 101. In response, the NLP system 101 may be configured to perform one or more NLP operations, such as one or more NLP operations that require at least one JST modeling operation, on the received NLP inputs in order to generate NLP outputs and provide the generated NLP outputs to the external computing entities 102.

In some embodiments, the NLP system 101 and the external computing entities 102 may be configured to communicate over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

In some embodiments, the NLP inputs provided to the NLP system 101 by the external computing entities 102 include data associated with a document corpus. A document corpus may include one or more digital documents. A digital document may be a collection of one or more NLP data values, such as one or more alphanumeric characters associated with an unstructured text document. Examples of digital documents include a feedback data object that includes text data for feedback from a user entity (e.g., a patient user entity, a medical provider user entity, and/or the like). Such feedback data objects may be generated using at least one of one or more End-of-Service (ETS) surveys, one or more Interactive Voice Response (IVR) surveys, one or more email-based surveys, and one or more touch-point surveys. Other examples of digital documents included in the NLP inputs may include medical note digital documents, medical protocol digital documents, and/or the like.

In some embodiments, the NLP inputs provided to the NLP system 101 by the external computing entities 102 include data associated with a document corpus, as well as initial sentiment information for at least one of the digital documents in the document corpus. For example, the initial sentiment information for a digital document may include a sentiment value and/or a sentiment label for the digital document that is generated using a naïve NLP process. As another example, the initial sentiment information for a digital document may be a rating of the digital document by an author user entity associated with the digital document and/or by a reviewer user entity associated with the digital document. As yet another example, when a digital document relates to a particular real-world event, the initial sentiment information for the digital document may be generated based at least in part on an overall rating of the particular real-world event (e.g., a patient rating of a medical procedure and/or an auditor rating of a medical procedure). As a further example, when a digital document relates to real-world customer experience event, the initial sentiment information for the digital document may be generated based at least in part on a Net Promoter Score (NPS) measure for the real-world customer experience event.

The NLP system 101 is configured to process the NLP inputs received from the external computing entities 102 to generate corresponding NLP outputs. Examples of NLP outputs are provided below. However, one of ordinary skill in the art will recognize that the provided examples are not meant to be exhaustive and that the NLP outputs generated by the NLP system 101 to provide to the external computing entities 102 may include other data objects generated based at least in part on the NLP inputs which are not listed below.

In some embodiments, when the NLP inputs provided to the NLP system 101 by the external computing entities 102 include one or more digital documents, the NLP outputs generated by the NLP system 101 and provided by the NLP system 101 to the external computing entities 102 may include at least one of the following: (i) one or more per-document topic designations for each of the one or more digital documents; (ii) one or more per-document sentiment designations for each of the one or more digital documents; (iii) one or more per-document topic-specific sentiment designations for each of the one or more digital documents; (iv) one or more per-word topic designations for at least some of the words in the one or more digital documents; (v) one or more per-word sentiment designations for each of at least some of the words in the one or more digital documents; and (vi) one or more per-word topic-specific sentiment designations for each of the one or more digital documents.

In some embodiments, when the NLP inputs provided to the NLP system 101 by the external computing entities 102 include one or more digital documents characterized by a range of one or more candidate sentiment labels, the NLP outputs generated by the NLP system 101 and provided by the NLP system 101 to the external computing entities 102 may include at least one of the following: (i) one or more cross-document per-word topic-sentiment correlation indicators for the one or more digital documents; (ii) one or more per-document topic correlation indicators for each of the one or more digital documents; (iii) one or more per-document topic-sentiment correlation indicators for each of the one or more digital documents; and (iv) one or more per-sentiment-label topic-word correlation indicators for each of the one or more candidate sentiment labels in the range of one or more candidate sentiment labels associated with the one or more digital documents.

In some embodiments, when the NLP inputs provided to the NLP system 101 by the external computing entities 102 include one or more feedback digital documents related to operations of an organizational predictive entity (e.g., a healthcare delivery predictive entity), the NLP outputs generated by the NLP system 101 and provided to the external computing entities 102 may include operational recommendations for the organizational predictive entity and/or automatic operational adjustments to the operations of the organizational predictive entity. Examples of such operational NLP outputs include critical event identification policies, critical event prioritization policies, NPS improvement policies, customer targeting policies, growth attainment policies, operational management policies, and/or the like.

The NLP system 101 may include a storage subsystem 108 and a JST modeling computing entity 106. The JST modeling computing entity 106 may be configured to perform the one or more JST modeling operations on the NLP inputs provided by the one or more external computing entities 102. To perform the JST modeling operations, the JST modeling computing entity 106 may generate and utilize one or more NLP distributions. To generate each NLP distribution, the JST modeling computing entity 106 may utilize one or more hyper-parameters associated with the NLP distribution.

The storage subsystem 108 may be configured to store data associated with the NLP distributions by the JST modeling computing entity 106, such as distribution definition data 121 associated with the NLP distributions and distribution hyper-parameter data 122 associated with the NLP distributions. The storage subsystem 108 may further be configured to store data associated with the NLP inputs (e.g., document corpus data 123 associated with one or more NLP inputs provided by the external computing entities 102 and/or initial sentiment data 124 associated with document corpuses in one or more NLP inputs provided by the external computing entities). The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The NLP distributions generated and utilized by the JST modeling computing entity 106 may each be characterized by an inferred distribution between two or more of digital documents in an input document corpus, words (e.g., n-grams, such as unigrams or bigrams) in the digital documents, candidate topic designations (e.g., from a discrete or continuous range of candidate topic designations) for the input document corpus, and candidate sentiment designations (e.g., from a discrete or continuous range of candidate sentiment designations) for the input document corpus. The inferred distributions characterizing the NLP distributions may in turn be generated as distributions over hyper-parameters associated with the NLP distributions. In some embodiments, at least a part of the data describing distributions characterizing the NLP distributions and/or at least a part of the data describing hyper-parameters of the NLP distributions are stored in the storage subsystem 108, as part of the distribution definition data 121 of the storage subsystem 108 and the distribution hyper-parameter data 122 of the storage subsystem respectively. Example NLP distributions are described below. However, one of ordinary skill in the art will recognize that the JST modeling computing entity 106 may generate and utilize other NLP distributions between two or more of digital documents, words, candidate topic designations, and candidate sentiment designations.

As discussed above, to generate the NLP distributions, the JST modeling computing entity 106 may utilize one or more distribution hyper-parameters for the NLP distributions, such as one or more distribution hyper-parameters stored as part of the distribution hyper-parameter data 122 on the storage subsystem 108. The hyper-parameters of an NLP distribution (a.k.a. the "prior parameters" or "priors" of the NLP model) are pre-configured data that affect the configuration of the NLP distribution. For example, at least one hyper-parameter of a particular NLP distribution may be determined based at least in part on preconfigured distribution definition data generated by the NLP system 101 and/or preconfigured distribution configuration data provided to the NLP system 101 by one or more external computing entities 102. In some embodiments, at least some of the hyper-parameters of the NLP distributions utilized by the JST modeling computing entity 106 are stored as part of the distribution hyper-parameter data 122 on the storage subsystem 108. A schematic diagram of example distribution hyper-parameter data 122 stored on the storage subsystem 108 is provided in FIG. 5.

In some embodiments, the NLP distributions utilized by the JST modeling computing entity 106 include at least one of the following distributions: a per-document topic distribution ($\theta$) 401 generated by a per-document topic modeling engine 111 of the JST modeling computing entity 106; a per-document topic-sentiment distribution ($\pi$) 402 generated by a per-document topic-sentiment modeling engine 112 of the JST modeling computing entity 106; and a cross-document per-word topic-sentiment distribution ($\varphi$) 403 generated by a cross-document per-word topic-sentiment modeling engine 113 of the JST modeling computing entity 106. The mentioned NLP distributions as well as their respective defining distributions are described in greater detail below with reference to the per-document topic modeling engine 111, the per-document topic-sentiment modeling engine 112, and the cross-document per-word topic-sentiment modeling engine 113.

Exemplary Per-Document Topic Modeling Engine

The per-document topic modeling engine 111 is configured to generate the per-document topic distribution ($\theta$) 401 for an input document corpus associated with a range of candidate topic designations. The per-document topic distribution for an input document corpus and a range of candidate topic designations is a distribution that indicates a per-document correlation indicator for each document-topic pair of a digital document in the input document corpus and a candidate topic designation from the range of candidate topic designations. For example, given an input document corpus that includes four digital documents D1, D2, D3, and D4, and further given a range of two candidate topic designations T1 and T2, the per-document topic distribution ($\theta$) 401 for the input corpus may indicate that document D1 is 30% associated with T1 and 70% associated with T2; document D2 is 60% associated with T1 and 40% associated with T2; document D3 is 80% associated with T1 and 20% associated with T2; and document D4 is 50% associated with T1 and 50% associated with T2. In the described example, the values 0.30, 0.70, 0.60, 0.40, 0.80, 0.20, 0.50, and 0.50 may be referred to as per-document topic correlation indicators for document-topic pairs (D1, T1), (D1, T2), (D2, T1), (D2, T2), (D3, T1), and (D4, T2) respectively.

In some embodiments, to generate the per-document topic distribution ($\theta$) 401, the per-document topic modeling engine 111 may utilize a topic distribution hyper-parameter ($\alpha$) 501, which may be stored as part of the distribution hyper-parameter data 122 on the storage subsystem 108. In some embodiments, the per-document topic modeling engine 111 generates the per-document topic distribution ($\theta$) 401 for an input document corpus and a range of candidate topic designations based at least in part on a distribution over the topic distribution hyper-parameter ($\alpha$) 501 for the input document corpus and the range of candidate topic designations (e.g., a Dirichlet distribution over the topic distribution hyper-parameter ($\alpha$) 501 for the input document corpus and the range of candidate topic designations). The topic distribution hyper-parameter ($\alpha$) 501 may be a data value associated with an input document corpus and a range of candidate topic designations that indicates the likelihood that each digital document in the input document corpus may be associated with all candidate topic designations in the range of candidate topic designations. In some embodiments, the topic distribution hyper-parameter ($\alpha$) 501 for an input document corpus and a range of candidate topic designations may indicate a measure of statistical distribution (e.g., an average and/or median) of multi-topic-inclusivity of the digital documents in the input document corpus in relation to the range of candidate topic designations.

For example, if each digital document in an input document corpus may be associated with at least one candidate topic designation selected from a range of three candidate topic designations T1, T2, and T3, the topic distribution hyper-parameter ($\alpha$) 501 may indicate a likelihood that each digital document in the input document corpus will be associated with each of the three candidate topic designations T1, T2, and T3. In the noted example, a high value of the topic distribution hyper-parameter ($\alpha$) 501 for the noted input document corpus may indicate a high likelihood that each digital document in the input document corpus is associated with each candidate topic designations of the three candidate topic designations T1, T2, and T3, while a low value of the topic distribution hyper-parameter ($\alpha$) 501 for the noted input document corpus may indicate a low likelihood that each digital document in the input document corpus is associated with each candidate topic designations of the three candidate topic designations T1, T2, and T3.

Exemplary Per-Document Topic-Sentiment Modeling Engine

The per-document topic-sentiment modeling engine 112 is configured to generate the per-document topic-sentiment distribution ($\pi$) 402 for an input document corpus associated with a range of candidate topic designations and a range of candidate sentiment designations. The per-document topic-sentiment distribution ($\pi$) 402 for an input document corpus, a range of candidate topic designations, and a range of candidate sentiment designations is a distribution that indicates, for each digital document in the input document corpus, a corresponding per-document topic-sentiment correlation indicator for each topic-sentiment pair of a candidate topic designation from the range of candidate topic designations and candidate sentiment designation from the range of candidate sentiment designations. For example, given an input document corpus that includes two digital documents D1 and D2, the range of candidate topic designations T1 and T2, and the range of candidate sentiment destinations S1 and S2, the corresponding per-document topic-sentiment distribution ($\pi$) 402 may indicate that: (i) to the extent document D1 relates to topic T1, document D1 has a 90% ratio of sentiment S1 and a 10% ratio of sentiment S2; (ii) to the extent document D1 relates to topic T2, document D1 has a 30% ratio of sentiment S1 and a 70% ratio of sentiment S2; (iii) to the extent document D2 relates to topic T1, document D2 has a 40% ratio of sentiment S1 and a 60% ratio of sentiment S2; and (iv) to the extent document D2 relates to topic T2, document D1 has a 50% ratio of sentiment S1 and a 50% ratio of sentiment S2. In the mentioned examples, digital document D1 may be associated with per-document sentiment correlation indicators 0.90 and 0.10 for topic-sentiment pairs (T1, S1) and (T1, S2) respectively and per-document sentiment correlation indicators 0.30 and 0.70 for topic-sentiment pairs (T2, S1) and (T2, S2) respectively. Moreover, in the mentioned examples, digital document D2 may be associated with per-document sentiment correlation indicators 0.40 and 0.60 for topic-sentiment pairs (T1, S1) and (T1, S2) respectively and per-document sentiment correlation indicators 0.50 and 0.50 for topic-sentiment pairs (T2, S1) and (T2, S2) respectively.

In some embodiments, to generate the per-document topic-sentiment distribution ($\pi$) 402 for a particular digital document in an input document corpus, the per-document topic-sentiment modeling engine 112 may utilize a per-document sentiment distribution hyper-parameter ($\gamma^d$) for the particular digital document, where the document sentiment distribution hyper-parameter ($\gamma^d$) for the particular digital document is in turn determined based at least in part on at least one of a cross-document sentiment distribution hyper-parameter ($\gamma$) 502 for the input document corpus and a per-document initial sentiment hyper-parameter ($\lambda^d$) 503 for the particular digital document. For example, the per-document topic-sentiment modeling engine 112 may first generate a per-document sentiment distribution hyper-parameter ($\gamma^d$) for a particular digital document in an input document corpus based at least in part on the cross-document sentiment distribution hyper-parameter ($\gamma$) 502 for the input document corpus and (if such information is available for the particular digital document) the per-document initial sentiment hyper-parameter ($\lambda^d$) 503 for the particular digital document. Afterward, the per-document topic-sentiment modeling engine 112 may generate the per-document topic-sentiment distribution ($\pi$) 402 for the particular digital document as a distribution over the per-document sentiment distribution hyper-parameter ($\gamma^d$) for the particular digital document (e.g., a Dirichlet distribution over the per-document sentiment distribution hyper-parameter ($\gamma^d$) for the particular digital document).

The sentiment distribution hyper-parameter ($\gamma$) 502 for an input document corpus, a range of candidate topic designations, and a range of candidate sentiment designations may be a data value configured to indicate a likelihood that each digital document in the input document corpus includes a threshold per-document topic-sentiment correlation value for each topic-sentiment pair of a candidate topic designation from the range of candidate topic designations and a candidate sentiment designation from the range of candidate sentiment designations. For example, if each digital document in an input document corpus may be associated with at least one candidate topic designation selected from a range of three candidate topic designations T1, T2, and T3 as well as at least one candidate sentiment designation selected from a range of three candidate sentiment designations S1, S2, and S3, the sentiment distribution hyper-parameter ($\gamma$) 502 for the input document corpus may indicate the likelihood that each document in the input document corpus will be associated with all of the sentiment-topic pairs (T1, S1), (T1, S2), (T1, S3), (T2, S1), (T2, S2), (T2, S3), (T3, S1), (T3, S2), and (T3, S3). In the noted example, a high value of the sentiment distribution hyper-parameter ($\gamma$) 502 for the noted input document corpus may indicate a high likelihood that each digital document in the input document corpus is associated with all of the sentiment-topic pairs (T1, S1), (T1, S2), (T1, S3), (T2, S1), (T2, S2), (T2, S3), (T3, S1), (T3, S2), and (T3, S3); meanwhile, a low value of the sentiment distribution hyper-parameter ($\gamma$) 502 for the noted input document corpus may indicate a low likelihood that each digital document in the input document corpus is associated with all of the sentiment-topic pairs (T1, S1), (T1, S2), (T1, S3), (T2, S1), (T2, S2), (T2, S3), (T3, S1), (T3, S2), and (T3, S3).

The per-document initial sentiment hyper-parameter ($\lambda$) 503 for a digital document may be a value configured to indicate at least one aspect of initial sentiment information associated with the digital document. As indicated above, the NLP inputs provided to the NLP system 101 by the external computing entities 102 may include initial sentiment information associated with at least one digital document in an input document corpus. Such initial sentiment information, which may be stored as part of the initial sentiment data 124 in the storage subsystem and retrieved therefrom, can be used to in part define the per-document topic-sentiment distributions ($\pi$) 402 for those digital documents that have corresponding initial sentiment information. In some embodiments, to generate the per-document topic-sentiment correlation indicators for a particular document having particular initial sentiment information, the per-document topic-sentiment modeling engine 112 may utilize a per-document sentiment distribution hyper-parameter ($\gamma^d$) for the particular digital document, where the document sentiment distribution hyper-parameter ($\gamma^d$) for the particular digital document is in turn determined based at least in part on at least one of a cross-document sentiment distribution hyper-parameter ($\gamma$) 502 for the input document corpus that includes the particular digital document and a per-document initial sentiment hyper-parameter ($\lambda^d$) 503 for the particular digital document.

Exemplary Cross-Document Per-Word Topic-Sentiment Modeling Engine

The cross-document per-word topic-sentiment modeling engine 113 is configured to generate the cross-document per-word topic-sentiment distribution ($\varphi$) 403 for a vocabulary collection (e.g., a collection of one or more words, where each word may be an n-gram such as a unigram or a bigram), a range of candidate topic designations, and a range of candidate sentiment designations. The cross-document per-word topic-sentiment distribution ($\varphi$) 403 for an input vocabulary collection, a range of candidate topic designations, and a range of candidate sentiment designations is a distribution that indicates for, each word in the vocabulary collection, a corresponding per-word topic-sentiment correlation indicator for each topic-sentiment pair of a candidate topic designation from the range of candidate topic designations and candidate sentiment designation from the range of candidate sentiment designations.

For example, given a vocabulary collection that includes words W1, W2, and W3, the range of candidate topic designations T1 and T2, and the range of candidate sentiment destinations S1 and S2, the corresponding cross-document per-word topic-sentiment distribution ($\varphi$) 403 may indicate that: (i) when word W1 occurs in relation to topic T1, word W1 has a 70% ratio of sentiment S1 and a 30% ratio of sentiment S2; (ii) when word W1 occurs in relation to topic T2, word W1 has a 80% ratio of sentiment S1 and a 20% ratio of sentiment S2; (iii) when word W2 occurs in relation to topic T1, word W2 has a 60% ratio of sentiment S1 and a 40% ratio of sentiment S2; (iv) when word W2 occurs in relation to topic T2, document D1 has a 80% ratio of sentiment S1 and a 20% ratio of sentiment S2; (v) when word W3 occurs in relation to topic T1, word W3 has a 40% ratio of sentiment S1 and a 60% ratio of sentiment S2; (vi) when word W3 occurs in relation to topic T2, document D1 has a 70% ratio of sentiment S1 and a 30% ratio of sentiment S2. In the above-mentioned example, word W1 is associated with the following cross-document per-word topic-sentiment correlation indicators: 0.70 for topic-sentiment pair (T1, S1), 0.30 for topic-sentiment pair (T1, S2), 0.80 for topic-sentiment pair (T2, S1), and 0.20 for topic-sentiment pair (T2, S2). Furthermore, in the above-mentioned example, word W2 is associated with the following cross-document per-word topic-sentiment correlation indicators: 0.60 for topic-sentiment pair (T1, S1), 0.40 for topic-sentiment pair (T1, S2), 0.80 for topic-sentiment pair (T2, S1), and 0.20 for topic-sentiment pair (T2, S2). Moreover, in the above-mentioned example, word W3 is associated with the following cross-document per-word topic-sentiment correlation indicators: 0.40 for topic-sentiment pair (T1, S1), 0.60 for topic-sentiment pair (T1, S2), 0.70 for topic-sentiment pair (T2, S1), and 0.40 for topic-sentiment pair (T2, S2).

In some embodiments, to generate a cross-document per-word topic-sentiment distribution ($\varphi$) 403, the cross-document per-word topic-sentiment modeling engine 113 may utilize a topic-sentiment distribution hyper-parameter ($\beta$) 504. For example, the cross-document per-word topic-sentiment modeling engine 113 may generate the cross-document per-word topic-sentiment distribution ($\varphi$) 403 for a vocabulary collection, a range of candidate topic designations, and a range of candidate sentiment designations as a distribution over the topic-sentiment distribution hyper-parameter ($\beta$) 504 for the vocabulary collection, the range of candidate topic designations, and the range of candidate sentiment designations (e.g., a Dirichlet distribution over the topic-sentiment distribution hyper-parameter ($\beta$) 504 for the vocabulary collection, the range of candidate topic designations, and the range of candidate sentiment designations).

The topic-sentiment distribution hyper-parameter ($\beta$) 504 for a vocabulary collection, a range of candidate topic designations, and a range of candidate sentiment designations may be a data value configured to indicate a likelihood that each word in the vocabulary collection has a threshold correlation with each topic-sentiment pair of a candidate topic designation from the range of candidate topic designations and a candidate sentiment designation from the range of candidate sentiment designations. For example, if each word in a vocabulary collection may be associated with at least one candidate topic designation selected from a range of three candidate topic designations T1, T2, and T3 as well as at least one candidate sentiment designation selected from a range of three candidate sentiment designations S1, S2, and S3, the topic-sentiment distribution hyper-parameter ($\beta$) 504 for the vocabulary collection may indicate the likelihood that each word in the vocabulary collection will be associated with all of the sentiment-topic pairs (T1, S1), (T1, S2), (T1, S3), (T2, S1), (T2, S2), (T2, S3), (T3, S1), (T3, S2), and (T3, S3). In the noted example, a high value of the topic-sentiment distribution hyper-parameter ($\beta$) 504 for the vocabulary collection may indicate a high likelihood that each word in the vocabulary collection is associated with all of the sentiment-topic pairs (T1, S1), (T1, S2), (T1, S3), (T2, S1), (T2, S2), (T2, S3), (T3, S1), (T3, S2), and (T3, S3); meanwhile, a low value of topic-sentiment distribution hyper-parameter ($\beta$) 504 for the vocabulary collection may indicate a low likelihood that each word in the vocabulary collection corpus is associated with all of the sentiment-topic pairs (T1, S1), (T1, S2), (T1, S3), (T2, S1), (T2, S2), (T2, S3), (T3, S1), (T3, S2), and (T3, S3).

In addition to generating the NLP distributions, the JST modeling computing entity 106 is further configured to utilize the generated NLP distributions to perform various JST modeling operations. The JST modeling operations seek to utilize the NLP distributions to generate one or more NLP outputs, such as the NLP outputs described above. In some embodiments, the JST modeling computing entity 106 may utilize a model coordination engine 114, which is configured to use the generated NLP distributions (e.g., the per-document topic correlation distribution ($\theta$) 401, the per-document topic-sentiment distribution ($\pi$) 402, the cross-document per-word topic-sentiment distribution ($\varphi$) 403, and/or the like) to perform one or more JST modeling operations, such as the one or more JST modeling operations configured to generate the NLP outputs described above. Exemplary operations of the model coordination engine 114 are described in greater detail below with reference to FIGS. 6-14.

Exemplary JST Modeling Computing Entity

FIG. 2 provides a schematic of a JST modeling computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the JST modeling computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the JST modeling computing entity 106 may include or be in communication with one or more processing elements 205 (also referred to as processors, processing circuitry, and/or similar terms used herein interchangeably) that communicate with other elements within the JST modeling computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the JST modeling computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the JST modeling computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the JST modeling computing entity 106 with the assistance of the processing element 205 and operating system.

As indicated, in one embodiment, the JST modeling computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the JST modeling computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the JST modeling computing entity 106 may include or be in communication with one or more input elements, such as a keyboard input, a mouse input, a touch screen/display input, motion input, movement input, audio input, pointing device input, joystick input, keypad input, and/or the like. The JST modeling computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the JST modeling computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the JST modeling computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the JST modeling computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the JST modeling computing entity 106 and/or various other computing entities.

In another embodiment, the external computing entity 102 may include one or more components or functionality that are the same or similar to those of the JST modeling computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operations

JST modeling is an important problem in NLP analysis as it combines benefits of topic modeling and sentiment modeling. For example, one area in which JST modeling is beneficial relates to automatic feedback data analysis. When analyzing feedback data (e.g., customer feedback data), an NLP analysis module will benefit from determining not just which topics feedback data refers to and what sentiments the feedback data entails, but also how the topic model of the feedback data and the sentiment model of the feedback data relate to each other. For example, when analyzing a feedback data document indicating that "The price of the camera is high but the quality is good; overall I am satisfied," a NLP analysis module would benefit from inferring not just that the feedback document relates to cameras, price of cameras, and quality of cameras and that the feedback document has a particular overall sentiment, but also that the feedback data document has a positive sentiment with respect to the camera topic designation, a negative sentiment with respect to the camera price topic designation, and a positive sentiment with respect to the camera price topic designation.

Various embodiments of the present invention address shortcomings of NLP solutions that fail to enable effective and reliable JST modeling. For example, as further described below, various embodiments of the present invention disclose NLP solutions that perform JST modeling using one or more of per-document topic distributions, per-document topic-sentiment distributions, and cross-document per-word topic-sentiment distributions. By providing effective and reliable solutions for JST modeling, various embodiments of the present invention address technical shortcomings of NLP systems that fail to properly model interactions between inferred topic models of documents and inferred sentiment models of documents. By modeling interactions between inferred topic models of documents and inferred sentiment models of documents, various embodiments of the present invention make technical contributions to effectiveness and reliability of NLP in domains in which interactions between inferred topic models of documents and inferred sentiment models of documents provide important predictive signals for NLP. As discussed above, examples of such domains include NLP domains that relate to feedback processing for improving operational processes. Accordingly, various embodiments of the present invention make important technical contributions to improving feedback processing and to improving operational processes in various organizational predictive entities such as hospitals.

FIG. 6 is data flow diagram of an example process 600 for performing JST modeling operations with respect to an input document (e.g., an input document D) in an input document corpus. Via the various steps/operations that correspond to the data flows of the process 600, the JST modeling computing entity 106 can perform effective and efficient JST modeling using at least a per-document topic correlation distribution ($\theta$) 401, a per-document topic-sentiment distribution ($\pi$) 402, and a cross-document per-word topic-sentiment distribution ($\varphi$) 403. The process 600 can be repeated for each input document of a number of input documents in an input document corpus.

As depicted in FIG. 6, the per-document topic modeling engine 111 of the JST modeling computing entity 106 receives the topic distribution hyper-parameter ($\alpha$) 501 for the input document corpus. Thereafter, the per-document topic modeling engine 111 utilizes the topic distribution hyper-parameter ($\alpha$) 501 for the input document corpus to generate the per-document topic distribution ($\theta$) 401 for the input document. In some embodiments, to generate the per-document topic distribution ($\theta$) 401 for the input document, the per-document topic modeling engine 111 generates a Dirichlet distribution over the topic distribution hyper-parameter ($\alpha$) 501 for the input document corpus. The per-document topic modeling engine 111 then provides the generated per-document topic distribution ($\theta$) 401 for the input document to the model coordination engine 114 of the JST modeling computing entity 106.

As further depicted in FIG. 6, the per-document topic-sentiment modeling engine 112 of the JST modeling computing entity 106 first adjusts a cross-document sentiment-distribution parameter ($\gamma$) 502 for the input document corpus based at least in part on a per-document initial sentiment hyper-parameter ($\lambda^d$) 503 for the input document in order to generate a per-document sentiment distribution hyper-parameter ($\gamma^d$) for the input document. In some embodiments, the per-document topic-sentiment modeling engine 112 first retrieves the cross-document sentiment-distribution parameter ($\gamma$) 502 for the input document corpus and the per-document initial sentiment hyper-parameter ($\lambda^d$) 503 for the input document from the distribution hyper-parameter data 122 stored on the storage subsystem. Afterward, the per-document topic-sentiment modeling engine 112 generates per-document sentiment distribution hyper-parameter ($\gamma^d$) for the input document based at least in part on the cross-document sentiment-distribution parameter (γ) 502 for the input document corpus and the per-document initial sentiment hyper-parameter ($\lambda^d$) 503 for the input document. In some embodiments, the per-document topic-sentiment modeling engine 112 of the JST modeling computing entity 106 further determines the per-document initial sentiment hyper-parameter ($\lambda^d$) 503 for the input document based at least in part on the initial sentiment data 124 for the input document. In some embodiments, if the input document lacks any associated initial sentiment information and/or any associated initial sentiment hyper-parameters ($\lambda^d$) 503, the per-document topic-sentiment modeling engine 112 does not perform any adjustments on the cross-document sentiment-distribution parameter (γ) 502 for the input document corpus based at least in part on the per-document initial sentiment hyper-parameter ($\lambda^d$) 503 for the input document in order to generate the per-document sentiment distribution hyper-parameter ($\gamma^d$) for the input document.

As further depicted in FIG. 6, after generating the per-document sentiment distribution hyper-parameter ($\gamma^d$) for the input document, the per-document topic-sentiment modeling engine 112 proceeds to generate the per-document topic-sentiment distribution (π) 402 for the input document based at least in part on the per-document sentiment distribution hyper-parameter ($\gamma^d$) for the input document. In some embodiments, to generate the per-document topic-sentiment distribution (π) 402 for the input document, the per-document topic-sentiment modeling engine 112 generates a Dirichlet distribution over the per-document sentiment distribution hyper-parameter ($\gamma^d$) for the input document. The per-document topic-sentiment modeling engine 112 then provides the generated per-document topic-sentiment distribution (π) 402 for the input document to the model coordination engine 114 of the JST modeling computing entity 106.

As further depicted in FIG. 6, the cross-document per-word topic-sentiment modeling engine 113 of the JST modeling computing entity 106 receives a topic-sentiment distribution hyper-parameter (β) 504 for an input vocabulary collection. Thereafter, the per-document topic modeling engine 111 utilizes the topic-sentiment distribution hyper-parameter (β) 504 for the input vocabulary collection to generate a cross-document per-word topic-sentiment distribution (φ) 403 for the input vocabulary collection. Importantly, the a cross-document per-word topic-sentiment distribution (φ) 403 is a cross-document distribution (a.k.a. a "global" distribution) whose values do not correspond to the input document and/or the input document corpus. In some embodiments, to generate the cross-document per-word topic-sentiment distribution (φ) 403 for the input vocabulary collection, cross-document per-word topic-sentiment modeling engine 113 generates a Dirichlet distribution over the topic-sentiment distribution hyper-parameter (β) 504 for the input vocabulary collection. The cross-document per-word topic-sentiment modeling engine 113 then provides the cross-document per-word topic-sentiment distribution (φ) 403 for the input vocabulary collection to the model coordination engine 114 of the JST modeling computing entity 106.

As further depicted in FIG. 6, the model coordination engine generates one or more topic designations (z) 601 for each word in the input document based at least in part on the per-document topic distribution (θ) 401 for the input document. In some embodiments, to select the one or more topic designations (z) 601 for each word in the input document based at least in part on the per-document topic distribution (θ) 401 for the input document, the model coordination engine 114 samples the topic designations (z) 601 from a range of candidate topic designations associated with the per-document topic distribution (θ) 401 for the input document based at least in part on a distribution over probability values defined by the per-document topic distribution (θ) 401 for the input document. In some of those embodiments, to select the one or more topic designations (z) 601 for each word in the input document based at least in part on the per-document topic distribution (θ) 401 for the input document, the model coordination engine 114 samples the topic designations (z) 601 from the range of candidate topic designations based at least in part on a multinomial distribution over probability values defined by the per-document topic distribution (θ) 401 for the input document.

As further depicted in FIG. 6, the model coordination engine 114 selects one or more sentiment designations (l) 602 (e.g., discrete sentiment labels and/or continuous sentiment values) for each word in the input document based at least in part on the per-document topic-sentiment distribution (π) 402 for the input document. In some embodiments, to select the sentiment designations (l) 602 for the input document based at least in part on the per-document topic-sentiment distribution (π) 402 for the input document, the model coordination engine 114 samples the sentiment designations (l) 602 from a range of candidate sentiment designations associated with the per-document topic-sentiment distribution (π) 402 for the input document based at least in part on a distribution over probability values defined by the per-document topic-sentiment distribution (π) 402 for the input document and the selected topic designations (z) 601 for the particular word. In some of those embodiments, to select the sentiment designations (l) 602 for the input document based at least in part on the per-document topic-sentiment distribution (π) 402 for the input document, the model coordination engine 114 samples the sentiment designations (l) 602 from the range of candidate sentiment designations based at least in part on a multinomial distribution over probability values defined by the per-document topic-sentiment distribution (π) 402 for the input document and the selected topic designations (z) 601 for the particular word.

As further depicted in FIG. 6, the model coordination engine 114 of the JST modeling computing entity 106 selects one or more word associations (w) 603-604 for each word in the input document based at least in part on the cross-document per-word topic-sentiment distribution (φ) 403 for the input vocabulary collection. In some embodiments, to select the word associations (w) 603-604 for each word in the input document based at least in part on the cross-document per-word topic-sentiment distribution (φ) 403 for the input vocabulary collection, the model coordination engine 114 samples the word associations (w) 603-604 from the input vocabulary collection based at least in part on a distribution over probabilities defined by the cross-document per-word topic-sentiment distribution (φ) 403 for the input vocabulary collection, the topic designations (z) 601 for the word, and the sentiment designations (l) 602 for the word. In some of those embodiments, to select the word associations (w) 603-604 for each word in the input document based at least in part on the cross-document per-word topic-sentiment distribution (φ) 403 for the input vocabulary collection, the model coordination engine 114 samples the word associations (w) 603-604 from the input vocabulary collection based at least in part on a multinomial distribution over probabilities defined by the cross-document per-word topic-sentiment distribution (φ) 403 for the input vocabulary collection, the topic designations (z) 601 for the word, and the sentiment designations (l) 602 for the word.

In some embodiments, to retrieve words from the input vocabulary collection in accordance with the cross-document per-word topic-sentiment distribution (φ) 403 for the input vocabulary collection as part of generating the word associations (w) 603-604 for each word in the input document, the model coordination engine 114 analyzes the retrieved words as pairs or bigrams. By retrieving bigrams, the model coordination engine 114 performs word-wise analysis while considering immediate contexts of words. Although the exemplary process 600 depicts selecting bigrams from the cross-document per-word topic-sentiment distribution (φ) 403 for the input vocabulary collection, one of ordinary skill in the art will recognize that n-grams of any size may be selected, including unigrams, bigrams, trigrams, and/or the like.

FIG. 7 is a flowchart diagram of an example process 700 for utilizing per-document NLP distributions and cross-document NLP distributions in order to perform one or more JST modeling operations with respect to an input document. Via the various steps/operations of process 700, the model coordination engine 114 of the JST modeling computing entity 106 can perform at least one of topic detections with respect to an input document corpus, sentiment detections with respect to an input document corpus, document-topic-sentiment correlation detections with respect to an input document corpus, global topic-sentiment correlation detections with respect to an input document corpus, word-topic-sentiment correlation detections with respect to an input document corpus, and/or the like.

The process 700 begins at step/operation 701 when the model coordination engine 114 obtains a per-document topic distribution for the input document, a per-document topic-sentiment distribution for each input document, and a cross-document per-word topic-sentiment distribution. In some embodiments, the cross-document per-word topic-sentiment distribution is associated with the input document and/or associated with a vocabulary collection related to the input document. For example, if the input document relates to a medical topic, the cross-document per-word topic-sentiment distribution may entail cross-document per-word topic-sentiment correlation indicators for the medical field (e.g., cross-document per-word topic-sentiment correlation indicators extracted from a medical dictionary and/or from a medical semantic database).

An exemplary per-document topic distribution data object 800 that includes per-document topic distributions for three documents is presented in FIG. 8. As depicted in the per-document topic distribution data object 800, each per-document topic distribution 811-813 for a particular digital document associates the corresponding document for the per-document topic distribution 811-813 with a group of per-document topic correlation indicators, where each per-document topic-correlation indicator indicates a predicted magnitude of correlation between a corresponding document and a corresponding topic designation. For example, as depicted in the per-document topic distribution data object 800, document 1 and topic 1 are associated with the per-document topic correlation indicator 0.75, while document 3 and topic 2 are associated with the per-document topic correlation indicator 0.4.

An exemplary per-document topic-sentiment distribution data object 900 that includes three per-document topic-sentiment distributions 911-913 for three documents is depicted in FIG. 9. Each of the three per-document topic-sentiment distributions 911-913 is associated with various per-document topic-sentiment correlation indicators for various topic-sentiment pairs. For example, as depicted in the per-document topic-sentiment distribution 911, document 1 is associated with the per-document topic-sentiment correlation indicator 0.6 for the topic-sentiment pair (Topic 2, Sentiment +ve) and the per-document topic-sentiment correlation indicator 0.8 for the topic-sentiment pair (Topic 3, Sentiment −ve).

An exemplary embodiment of cross-document per-word topic-sentiment distribution data 1000 for four words (e.g., words "claim", "service", "excellent", and "rx"), three candidate topic designations (e.g., candidate topic designations corresponding to topics 1, 2, and 3), and two candidate sentiment designations (e.g., candidate sentiment designations corresponding to sentiments +ve and −ve) is depicted in FIG. 10. For example, as depicted in the cross-document per-word topic-sentiment distribution data object 1011, word "claim" is associated with the cross-document per-word topic-sentiment correlation indicator 0.4 for the topic-sentiment pair (Topic 1, Sentiment +ve) and the cross-document per-word topic-sentiment correlation indicator 0.05 for the topic-sentiment pair (Topic 3, Sentiment +ve). Although the data objects 1011-1012 depicted in FIG. 10 are each characterized by association with a corresponding candidate sentiment designation, one of ordinary skill in the art will recognize that other cross-document per-word topic-sentiment distribution data may be characterized by association with at least one of candidate sentiment designations, candidate topic designations, and words.

At step/operation 702, the model coordination engine 114 generates, for each selected word of at least a selected portion of words in the input document, a per-word topic designation and a per-word sentiment designation based at least in part on the per-document topic distribution for the input document and the per-document topic-sentiment distribution for the input document. In some embodiments, to generate a per-word topic designation $z_t$ and a per-word sentiment designation $l_t$ for a selected word $w_t$ in the input document d, the model coordination engine 114 may maximize the below posterior probability (e.g., by using Gibb's sampling with a fixed number of iterations):

$$p(z_t = j, l_t = k \mid w, z^{-t}, 1^{-t}, \alpha, \beta, \gamma) \propto \quad \text{Equation 1}$$

$$\frac{N_{j,k,p}^{-t} + \beta}{N_{j,k}^{-t} + V\beta} \cdot \frac{N_{j,k,q}^{-t} + \beta}{N_{j,k}^{-t} + V\beta} \cdot \frac{N_{d,j,k}^{-t} + \gamma_{d,k}}{N_{d,j}^{-t} + \sum_k \gamma_{d,k}} \cdot \frac{N_{d,j}^{-t} + \alpha_j}{N_d^{-t} + \sum_j \alpha_j}$$

In the above probability definition equation, α is a topic-distribution hyper-parameter, β is a topic-sentiment distribution hyper-parameter, γ is a cross-document sentiment distribution hyper-parameter, j is a topical iterative value that during each iteration is assigned to a candidate topic designation corresponding to the iteration, k is a sentiment iterative value that during each iteration is assigned to a candidate sentiment designation corresponding to the iteration, $N_{j,k,p}$ is determined based at least in part on a number of times that the word p is assigned to candidate topic designation j and candidate sentiment designation k, $N_{j,k,p}$ is determined based at least in part on a number of times that candidate sentiment designation k is assigned to the candidate topic designation j in document d, and $N_{d,j}$ is determined based at least in part on a number of times that the candidate topic designation j is assigned to document d.

At step/operation 703, the model coordination engine 114 generates a per-word semantic designation for each selected word in the input document based at least in part on the per-word topic designation for the selected word, the per-word sentiment designation for the selected word, and the cross-document per-word topic-sentiment distribution. In some embodiments, a semantic designation for a selected word is a data object that indicates one or more words from a vocabulary collection that are deem sufficiently related to the selected word. In some embodiments, to generate the per-word word designation for each selected word in the input document based at least in part on the per-word topic designation for the selected word, the per-word sentiment designation for the selected word, and the cross-document per-word topic-sentiment distribution, the model coordination engine 114 samples one or more words from the cross-document per-word topic-sentiment distribution in accordance with the probabilities defined by the per-word topic designation for the selected word and the per-word sentiment designation for the selected word.

At step/operation 704, the model coordination engine 114 generates one or more JST modeling outputs based at least in part on the per-word topic designations, the per-word sentiment designations, and the per-word semantic designations for the selected words in the input document. Operational examples of JS modeling outputs are presented in FIGS. 11-16 described in greater detail below. However, one of ordinary skill in the art will recognize that the model coordination engine 114 may generate any JST modeling output that uses at least one of one or more per-word topic designations, one or more per-word sentiment designations, one or more per-document topic-designations, one or more per-document sentiment designations, one or more cross-document topic designations, one or more cross-document sentiment designations, and/or the like.

For example, when the JST modeling outputs may include at least one of the following: (i) one or more per-document topic designations for each of one or more digital documents; (ii) one or more per-document sentiment designations for each of the one or more digital documents; (iii) one or more per-document topic-specific sentiment designations for each of the one or more digital documents; (iv) one or more per-word topic designations for at least some of the words in the one or more digital documents; (v) one or more per-word sentiment designations for each of at least some of the words in the one or more digital documents; and (vi) one or more per-word topic-specific sentiment designations for each of the one or more digital documents. As another example, the JST modeling outputs may include at least one of the following: (i) one or more cross-document per-word topic-sentiment correlation indicators for one or more digital documents; (ii) one or more per-document topic correlation indicators for each of the one or more digital documents; (iii) one or more per-document topic-sentiment correlation indicators for each of the one or more digital documents; and (iv) one or more per-sentiment-label topic-word correlation indicators for each of the one or more candidate sentiment labels in the range of one or more candidate sentiment labels associated with the one or more digital documents. As a further example, the JST modeling outputs may include operational recommendations for the organizational predictive entity and/or automatic operational adjustments to the operations of the organizational predictive entity. Examples of such operational JST modeling outputs include critical event identification policies, critical event prioritization policies, NPS improvement policies, customer targeting policies, growth attainment policies, operational management policies, and/or the like.

FIGS. 11A-11B provide operational examples of two JST modeling output interfaces 1110 and 1160. The JST modeling output interfaces 1110 and 1160 can be used to provide information about topic models of corresponding documents, sentiment models of corresponding documents, and/or relationships between topic models and sentiment models of corresponding documents.

As depicted in FIG. 11A, the JST modeling output interface 1110 depicts topic designations for selected words in the input document 1111. For example, the JST modeling output interface 1110 depicts the topic designation "camera" and the sentiment designation (thumps up, 90%) for the selected words "zoom is excellent" in the input document 1111. As another example, the JST modeling output interface 1110 depicts the topic designation "display" and the sentiment designation (thumps down, 50%) for the selected words "LCD is blurry" in the input document 1111. Moreover, the JST modeling output interface 1110 includes per-document topic designations 1121 for the input document 1111 and the per-document sentiment designation 1112 for the input document 1111.

As depicted in FIG. 11B, the JST modeling output interface 1160 depicts topic designations for selected words in the input document 1161. For example, the JST modeling output interface 1160 depicts the topic designation "price" and the sentiment designation (thumps up, 72%) for the selected words "great value . . . price" in the input document 1161. As another example, the JST modeling output interface 1110 depicts the topic designation "overall camera" and the sentiment designation (thumps up, 60%) for the selected words "good camera" in the input document 1161. Moreover, the JST modeling output interface 1160 includes per-document topic designations 1171 for the input document 1161 and the per-document sentiment designation 1162 for the input document 1161.

FIG. 12 provides an operational example of a cross-document per-word topic-sentiment distribution data object 1200 that depicts cross-document per-word topic-sentiment correlation indicators for a range of topic designation and a range of sentiment designations. The cross-document per-word topic-sentiment distribution data object 1200 may be determined based at least in part on pre-configured topic-sentiment correlation data and/or based at least in part on co-occurrences of topic designations and sentiment designations across various documents and/or across various document corpuses. For example, the cross-document per-word topic-sentiment distribution data object 1200 depicts that the topic-sentiment pair (Topic 1, Sentiment +ve) are associated with the cross-document per-word topic-sentiment correlation indicator 0.7. As another example, the cross-document per-word topic-sentiment distribution data object 1200 depicts that the topic-sentiment pair (Topic 3, Sentiment −ve) are associated with the cross-document per-word topic-sentiment correlation indicator 0.8.

FIG. 13 provides an operational example of a digital document 1300, while FIGS. 14-16 provide operational examples of a topic-sentiment correlation graph 1400, a topic word-sentiment correlation graph 1500, and a topic-sentiment correlation graph 1600 for the exemplary digital document 1300 of FIG. 13 respectively. In particular, the topic-sentiment correlation graph 1400 of FIG. 14 depicts sentiment designations for various topic designations associated with the digital document 1300; the topic word-sentiment correlation graph 1500 of FIG. 15 depicts sentiment designations for words in the digital document 1300 that convey a positive sentiment about a news-related topic; and the topic-sentiment correlation graph 1600 of FIG. 16 depicts various sentiment values for a news-related topic determined based at least in part on the digital document 1300.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a joint sentiment-topic (JST) modeling output for a digital document, the computer-implemented comprising:
    receiving, by one or more processors, a per-document topic distribution for the digital document, wherein the per-document topic distribution comprises a per-document topic correlation indication for each candidate topic designation of a plurality of candidate topic designations;
    receiving, by the one or more processors, a per-document topic-sentiment distribution for the digital document, wherein the per-document topic-sentiment distribution comprises (a) a per-document topic-sentiment correlation indication for each topic-sentiment pair of a candidate topic designation, and (b) a candidate sentiment designation of a plurality of candidate sentiment designations;
    generating, by the one or more processors and based at least in part on the per-document topic distribution and the per-document topic-sentiment distribution, (a) a topic designation for each selected word of one or more selected words in the digital document, and (b) a sentiment designation for each selected word of the one or more selected words in the digital document;
    generating, by the one or more processors, the JST modeling output for the digital document based at least in part on (a) each topic designation for a selected word of the one or more selected words, and (b) each sentiment designation for a selected word of the one or more selected words; and
    providing, by the one or more processors, the JST modeling output for the digital document to an end user device, wherein the end user device displays at least a portion of the JST modeling output.

2. The computer-implemented method of claim 1, wherein:
    the per-document topic distribution is generated based at least in part on a per-document topic distribution hyper-parameter for an input document corpus,
    the input document corpus comprises one or more digital documents,
    the one or more digital documents comprise the digital document, and
    the per-document topic distribution hyper-parameter indicates a likelihood that each of the one or more digital documents has a threshold correlation with each candidate topic designation of the plurality of candidate topic designations.

3. The computer-implemented method of claim 1, wherein:
    the per-document topic-sentiment distribution is generated based at least in part on a per-document sentiment distribution hyper-parameter for the digital document,
    the per-document sentiment distribution hyper-parameter for the digital document is generated based at least in part on a cross-document sentiment distribution hyper-parameter for an input document corpus,
    the input document corpus comprises one or more digital documents,
    the one or more digital documents comprise the digital document, and
    the cross-document sentiment distribution hyper-parameter indicates a likelihood that each of the one or more digital documents in the input document corpus has a threshold correlation with each topic-sentiment pair of a candidate topic designation of the plurality of candidate topic designations and a candidate sentiment designation of a plurality of candidate sentiment designations.

4. The computer-implemented method of claim 3, wherein:
    the per-document sentiment distribution hyper-parameter for the digital document is generated further based at least in part on a per-document initial sentiment hyper-parameter for the digital document, and
    the per-document initial sentiment hyper-parameter for the digital document is determined based at least in part on initial sentiment information for the digital document.

5. The computer-implemented method of claim 1, wherein generating the topic designation for a particular selected word of the one or more selected words comprises generating the topic designation by sampling from the plurality of candidate topic designations in accordance with the per-document topic distribution.

6. The computer-implemented method of claim 5, wherein sampling from the plurality of candidate topic designations comprises sampling from a multinomial distribution defined based at least in part on the per-document topic distribution.

7. The computer-implemented method of claim 1, wherein generating the sentiment designation for a particular selected word of the one or more selected words comprises generating the sentiment designation by sampling from the plurality of candidate sentiment designations in accordance with the per-document topic-sentiment distribution and the topic designation.

8. The computer-implemented method of claim 7, wherein sampling from the plurality of candidate sentiment designations comprises sampling from a multinomial distribution defined based at least in part on the per-document topic-sentiment distribution.

9. The computer-implemented method of claim 1, wherein:
    generating the topic designation and the sentiment designation for a particular selected word of the one or more selected words comprises performing a first number of JST designation routines to determine a topic-sentiment pair whose corresponding JST designation routine generates a maximum JST posterior probability,
    each JST designation routine of the first number of JST designation routines is associated with a topic-sentiment pair of a candidate topic designation of the plurality of candidate topic designations and a candidate sentiment designation of a plurality of candidate sentiment designations, each JST designation routine of the first number of JST designation routines is configured to generate a maximum JST posterior probability, and each maximum JST posterior probability for a JST designation routine of the first number of JST designation routines indicates an estimated likelihood of the topic-sentiment pair for the JST designation routine comprises the topic designation for the particular selected word and the sentiment designation for the particular selected word.

10. The computer-implemented method of claim 1, wherein:

the JST modeling output comprises a related word designation for each selected word of the one or more selected words, and the related word designation for a selected word of the one or more selected words comprises one or more vocabulary words of the plurality of vocabulary words that are deemed related to the selected word.

11. The computer-implemented method of claim 10, wherein generating the related word designation for a selected word of the one or more selected words comprises:

receiving a cross-document per-word topic-sentiment distribution, wherein the cross-document topic sentiment distribution indicates, for each vocabulary word of a plurality of vocabulary words, a plurality of cross-document per-word topic-sentiment correlation indicators, wherein each cross-document per-word topic-sentiment correlation indicator of the plurality of cross-document per-word topic-sentiment correlation indicators for a particular vocabulary word is associated with a topic-sentiment pair of a candidate topic designation of the plurality of candidate topic designations and a candidate sentiment designation of the plurality of candidate sentiment designations; and generating the related word designation by sampling from the plurality of vocabulary words in accordance with the cross-document per-word topic-sentiment distribution, the topic designation for the selected word, and the sentiment designation for the related word.

12. The computer-implemented method of claim 11, wherein sampling from the plurality of vocabulary words in accordance with the cross-document per-word topic-sentiment distribution, the topic designation for the selected word, and the sentiment designation for the related word comprises sampling from a multinomial distribution defined based at least in part on the cross-document per-word topic-sentiment distribution.

13. The computer-implemented method of claim 11, wherein sampling from the plurality of vocabulary words comprises sampling a bigram from the plurality of vocabulary words.

14. The computer-implemented method of claim 10, wherein:

the cross-document per-word topic-sentiment distribution is generated based at least in part on a topic-sentiment distribution hyper-parameter of the plurality of vocabulary words, and the cross-document sentiment distribution hyper-parameter indicates a likelihood that each of the plurality of vocabulary words has a threshold correlation with each topic-sentiment pair of a candidate topic designation of the plurality of candidate topic designations and a candidate sentiment designation of the plurality of candidate sentiment designations.

15. The computer-implemented method of claim 1, wherein:

the digital document is a feedback document associated with an organizational predictive entity, the JST modeling output comprises one or more operational recommendations for the organizational predictive entity, and at least one of the one or more operational recommendations for the organizational predictive entity is determined based at least in part on one or more of at least one topic designation for a selected word of the one or more selected words and at least one sentiment designation for a selected word of the one or more selected words.

16. The computer-implemented method of claim 1, wherein:

the digital document is a feedback document associated with an organizational predictive entity, the JST modeling output comprises one or more automatic operational adjustments for the organizational predictive entity, and at least one of the one or more automatic operational adjustments for the organizational predictive entity is determined based at least in part on one or more of at least one topic designation for a selected word of the one or more selected words and at least one sentiment designation for a selected word of the one or more selected words.

17. An apparatus for generating a joint sentiment-topic (JST) modeling output for a digital document, the apparatus comprising at least one processor and at least one memory including program code, the at least one memory and the program code configured to, with the processor, cause the apparatus to at least:

receive a per-document topic distribution for the digital document, wherein the per-document topic distribution comprises a per-document topic correlation indication for each candidate topic designation of a plurality of candidate topic designations;

receive a per-document topic-sentiment distribution for the digital document, wherein the per-document topic-sentiment distribution comprises (a) a per-document topic-sentiment correlation indication for each topic-sentiment pair of a candidate topic designation, and (b) a candidate sentiment designation of a plurality of candidate sentiment designations;

generate, based at least in part on the per-document topic distribution and the per-document topic-sentiment distribution, (a) a topic designation for each selected word of one or more selected words in the digital document, and (b) a sentiment designation for each selected word of the one or more selected words in the digital document;

generate the JST modeling output for the digital document based at least in part on (a) each topic designation for a selected word of the one or more selected words, and (b) each sentiment designation for a selected word of the one or more selected words; and provide the JST modeling output for the digital document to an end user device, wherein the end user device displays at least a portion of the JST modeling output.

18. The apparatus of claim 17, wherein:

generating the topic designation and the sentiment designation for a particular selected word of the one or more selected words comprises performing a first number of JST designation routines to determine a topic-sentiment pair whose corresponding JST designation routine generates a maximum JST posterior probability, each JST designation routine of the first number of JST designation routines is associated with a topic-sentiment pair of a candidate topic designation of the plurality of candidate topic designations and a candidate sentiment designation of a plurality of candidate sentiment designations, each JST designation routine of the first number of JST designation routines is configured to generate a maximum JST posterior probability, and each maximum JST posterior probability for a JST designation routine of the first number of JST designation routines indicates an estimated likelihood of the topic-sentiment pair for the JST designation routine comprises the topic designation for the particular selected word and the sentiment designation for the particular selected word.

19. A computer program product for generating a joint sentiment-topic (JST) modeling output for a digital document, the computer program product comprising at least one non-transitory computer-readable storage medium having computer-readable program code portions stored therein, the computer-readable program code portions configured to:

receive a per-document topic distribution for the digital document, wherein the per-document topic distribution comprises a per-document topic correlation indication for each candidate topic designation of a plurality of candidate topic designations;

receive a per-document topic-sentiment distribution for the digital document, wherein the per-document topic-sentiment distribution comprises (a) a per-document topic-sentiment correlation indication for each topic-sentiment pair of a candidate topic designation, and (b) a candidate sentiment designation of a plurality of candidate sentiment designations;

generate, based at least in part on the per-document topic distribution and the per-document topic-sentiment distribution, (a) a topic designation for each selected word of one or more selected words in the digital document, and (b) a sentiment designation for each selected word of the one or more selected words in the digital document;

generate the JST modeling output for the digital document based at least in part on (a) each topic designation for a selected word of the one or more selected words, and (b) each sentiment designation for a selected word of the one or more selected words; and provide the JST modeling output for the digital document to an end user device, wherein the end user device displays at least a portion of the JST modeling output.

20. The computer program product of claim 19, wherein: generating the topic designation and the sentiment designation for a particular selected word of the one or more selected words comprises performing a first number of JST designation routines to determine a topic-sentiment pair whose corresponding JST designation routine generates a maximum JST posterior probability, each JST designation routine of the first number of JST designation routines is associated with a topic-sentiment pair of a candidate topic designation of the plurality of candidate topic designations and a candidate sentiment designation of a plurality of candidate sentiment designations, each JST designation routine of the first number of JST designation routines is configured to generate a maximum JST posterior probability, and each maximum JST posterior probability for a JST designation routine of the first number of JST designation routines indicates an estimated likelihood of the topic-sentiment pair for the JST designation routine comprises the topic designation for the particular selected word and the sentiment designation for the particular selected word.

* * * * *